United States Patent [19]
Riener et al.

[11] Patent Number: 6,088,192
[45] Date of Patent: Jul. 11, 2000

[54] ROLL-BIASED HEAD SUSPENSION FOR REDUCED TRACK MISREGISTRATION

[75] Inventors: Timothy A. Riener, Fremont; James Montgomery Low; Jon Edward Jacoby, both of San Jose; Michael R. Hatch, Mountain View; Stephen P. Williams, Morgan Hill, all of Calif.

[73] Assignee: Quantum Corporation, Milpitas, Calif.

[21] Appl. No.: 08/736,117

[22] Filed: Oct. 24, 1996

Related U.S. Application Data

[63] Continuation-in-part of application No. 08/692,394, Aug. 5, 1996, abandoned.

[51] Int. Cl.[7] .................................................. G11B 5/58
[52] U.S. Cl. ............................................ 360/104; 360/109
[58] Field of Search .................................. 360/104, 106, 360/109

[56] References Cited

U.S. PATENT DOCUMENTS

| | | | |
|---|---|---|---|
| 5,027,241 | 6/1991 | Hatch et al. | 360/105 |
| 5,079,660 | 1/1992 | Yumura et al. | 360/104 |
| 5,381,288 | 1/1995 | Karam, II | 360/104 |
| 5,408,372 | 4/1995 | Karam, II | 360/104 |
| 5,471,734 | 12/1995 | Hatch et al. | 29/603 |
| 5,652,684 | 7/1997 | Harrison et al. | 360/104 |

OTHER PUBLICATIONS

McAllister, "The Effect of Platter Resonances on Track Misregistration in Disk Drives", *Sound and Vibration*, Jan. 1996, pp. 24–28.

*Primary Examiner*—Stuart S. Levy
*Assistant Examiner*—George J. Letscher
*Attorney, Agent, or Firm*—David B. Harrison

[57] ABSTRACT

A method corrects track misregistration attributable to out-of-plane motions of a rotating disk in a hard disk drive, and includes the steps of measuring a base plate-roll-bias angle between the rotating data storage disk and the head arm with a precision measuring device, and connecting the head arm and load beam at a roll-bias angle selected to minimize track misregistration attributable to the roll-bias. A number of connection arrangements and structures are presented in order to achieve the desired reduction in track misregistration.

47 Claims, 20 Drawing Sheets

CANTED SHIMS CONCEPT

ROTATED MOUNT SURFACES CONCEPT

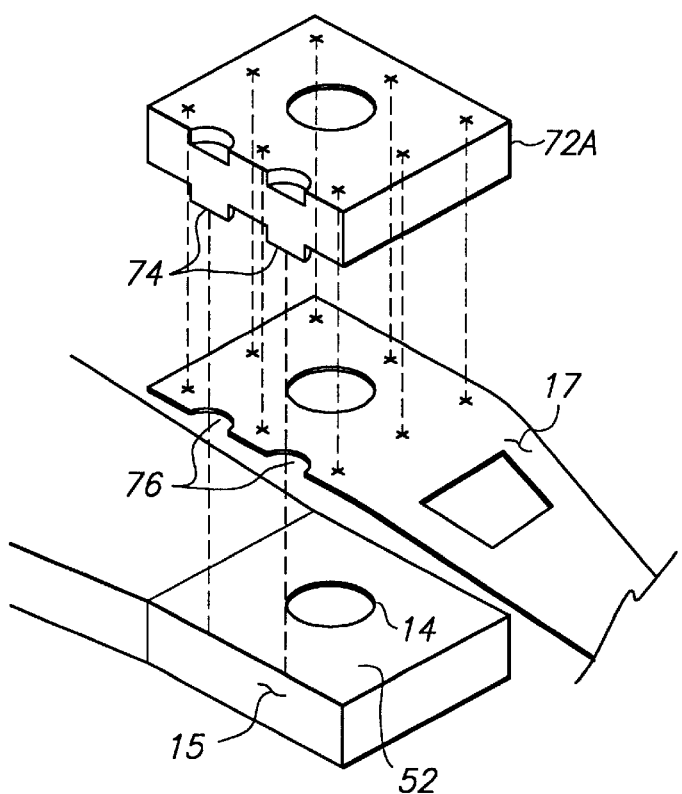
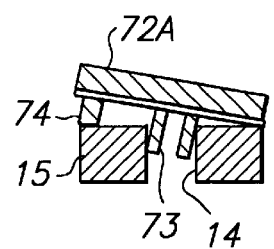
FIG. 16B
FIG. 16A

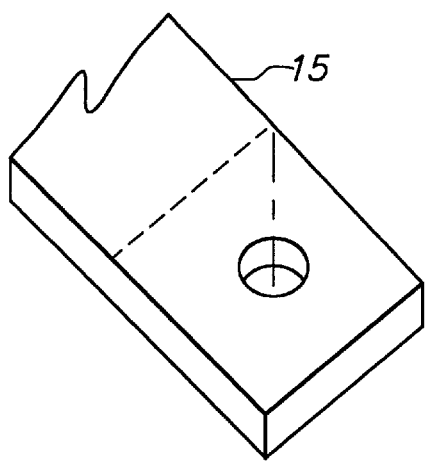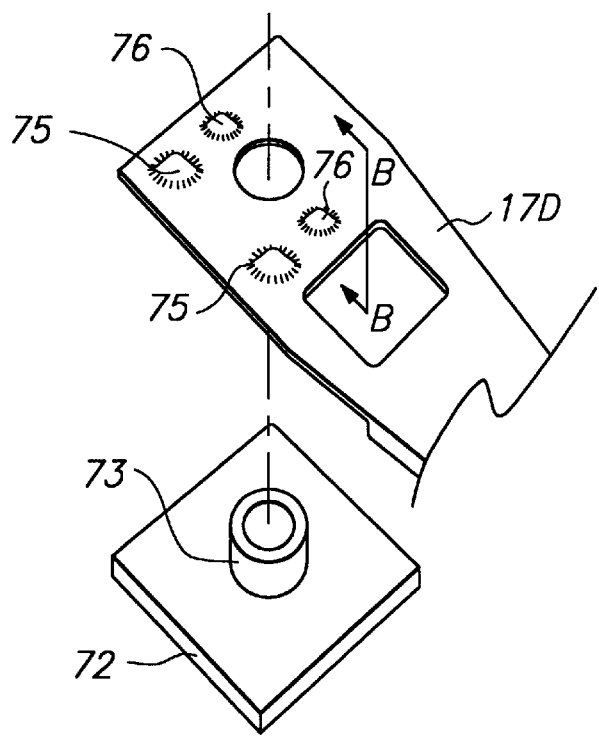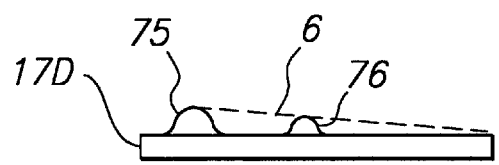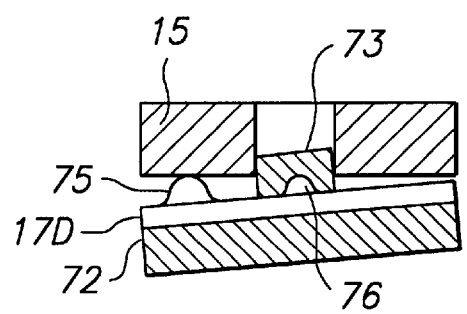
FIG. 22A
FIG. 22B
FIG. 22C

ROLL-BIASED HEAD SUSPENSION FOR REDUCED TRACK MISREGISTRATION

REFERENCE TO RELATED APPLICATION

This is a continuation-in-part of U.S. patent application Ser. No. 08/692,394 filed on Aug. 5, 1996, now abandoned.

FIELD OF THE INVENTION

The present invention relates to hard disk drives. More particularly, the present invention relates to a head suspension which has been roll-biased for minimizing head/disk track misregistration caused by out-of-plane motion of a storage disk relative to a nominal plane of rotation.

BACKGROUND OF THE INVENTION

A hard disk drive typically comprises a rotating data storage disk 10 and a read/write head transducer assembly including a slider 12 and an electromagnetic read/write transducer unit carried by the slider 12. A plan view of a disk drive of this type is shown in FIG. 1. The slider 12 is positioned radially relative to the rotating disk 10 by a head arm assembly 15, so that write and read elements follow a data track (dt) defined on a storage surface of the disk 10, there being a multiplicity of available concentric data track locations on the surface. The head arm assembly is moved to track (dt) by e.g. a rotary voice coil motor, not shown in FIG. 1.

During rotation of the disk 10, the slider 12 "flies" upon an air film bearing in very close proximity to a data storage surface of the disk. The slider 12 is mounted to a head arm 15 via a gimbal 16 (shown in FIG. 7) and a load beam or spring 17, which applies a predetermined preload force to the slider 12 through the gimbal 16, to urge the slider 12 toward a storage surface of the disk 10. Boundary layer airflow generated by disk rotation relative to the slider creates an air film bearing which enables the slider to "fly" in very close proximity to the disk surface. Because of gimbal mounting, in flight the slider 12 is free to "pitch" in the sense that the leading edge and trailing edge thereof move toward and away from the storage surface in a pitching motion. The slider 12 is also free to "roll" or rotate about the gimbal from side to side. Nominally, the disks 10 and the head-arm E-block 15 are mounted to a base 13 which may be a casting or stamping of e.g. aluminum alloy such that they nominally rotate in parallel planes. As thus far described, the disk drive of FIG. 1 is conventional. However, as will be explained hereinafter, the FIG. 1 disk drive includes a roll-biased head suspension for reduced track misregistration in accordance with principles of the present invention.

Disk drive designs have been characterized by increases in performance and data storage capacity. Performance has been increased by increasing the rotational speed of the disks, from e.g. 3600 RPM to 7200 RPM, or faster. Faster disk rotation provides the benefit of reducing average latency to a data record in a data track. Faster disk rotation has the undesirable drawback of potentially exciting one or more disk resonance modes by virtue of increased air turbulence, or by coupling vibrations through spindle bearings, for example. One consequence of disk resonance is that the disk 10 distorts out-of-plane during disk rotation. Disk vibrations, including but not limited to those occurring at disk resonance frequencies, have contributed to misalignment between the data transducer and a circular data track on the disk surface being followed by the data transducer. This misalignment is known in the art as track misregistration or "TMR".

Data storage capacities have been increased by reducing data track widths, and by increasing the number of tracks per disk. With smaller tracks which are closer together, sensitivity of TMR to disk out-of-plane movements from whatever cause has increased.

An article by J. S. McAllister entitled: "The Effect of Platter Resonances on Track Misregistration in Disk Drives", *Journal of Sound and Vibration*, January 1996, pp. 24–28, has attributed the disk vibrations to disk resonances driven primarily by internal windage excitation within the head-disk assembly ("HDA") and describes a correlation between the vibrations and TMR. This article further reports that the vibrations manifested by individual disks within the HDA are a characteristic common to all widely used 3.5 inch diameter aluminum alloy disk media. The article also reports that the vibrational behavior is dominated by disk material properties and geometry, and not by the spindle, enclosure or other structural design of the HDA. Moreover, the article does not address the kinematics and structural causes of disk-vibration-induced TMR and it presents no solutions to correct for the resultant TMR.

Observations and measurements made by the present inventors have confirmed the general vibrational behavior of 3.5 inch diameter aluminum storage disks noted by McAllister in the above article. Also, the inventors have noted disk out-of-plane movements and deflections being telegraphed by vibrations occurring in the disk spindle assembly. These effects are difficult to control, and impossible to eliminate altogether. Further, because of the lack of true planarity between disks and head arms discussed above, the present inventors have observed differences in TMR, depending upon whether a particular data transducer is "up-facing" or "down-facing" relative to a disk storage surface. Specifically, in at least one family of disk drives up-facing transducers have been observed to have lower TMR than down-facing transducers in the presence of disk out-of-plane vibrations and motions. Also, the TMR effect has been observed to become worse as one observes from an inside diameter track to an outside diameter track of a storage disk within the HDA.

As a disk moves out of its nominal rotational plane in response to a deflecting force or vibrational excitation, the disk simultaneously deforms or rotates in such a way as to displace the data track recorded on the disk surface in both radial and out-of-plane directions relative to the base 13. Also, simultaneously, the slider and read/write head is moved off-track due to the fact that it is attached to a compliant suspension/head gimbal assembly, and therefore follows the disk contour. As the slider follows the radial and out-of-plane motion of the disk 10, the slider moves off of track.

Thus, we say that the radial and out-of-plane movements of the disk are "coupled" to the TMR parameter. This coupling is present in a disk drive in which the disks 10 and actuator 15 rotate in parallel planes. In disk drives in which the disks 10 and actuator 15 rotate in planes slightly out of parallelism, due to manufacturing tolerances, the disk movements may result in differential TMR between the down-facing transducers and the up-facing transducers.

One approach to solving the presently discussed problem with disk distortion would be to stiffen the storage disk to reduce vertical distortion, by making the disk (nominally 0.8 mm thick) thicker, with a negative impact on the overall achievable disk drive Z height dimension (measured in the direction of disk spindle elevation). Another approach would be to make the disks with either a smaller outside diameter with consequent reduced data storage capacity, or of a material having a greater stiffness, such as glass or ceramic, but at increased cost. A third approach might be to form the storage disk as a composite laminar construction including an inner constrained layer of suitable damping material, only realizable at much greater prime cost per disk.

Thus, a hitherto unsolved need has remained for a method for reducing TMR caused by out-of-plane disk motions and distortion in a manner enabling continued use of conventional disks and heads and with minimum additional expense.

SUMMARY OF THE INVENTION WITH OBJECTS

A general object of the present invention is to provide a method and apparatus for reducing TMR in a hard disk drive which is coupled to out-of-plane motions of a data storage disk in a manner overcoming limitations and drawbacks of the prior art.

Another object of the present invention is to provide a method and apparatus for adding a roll-bias to a data transducer suspension assembly in a hard disk drive in a manner reducing TMR during out-of-plane motions of a storage disk in a manner overcoming limitations and drawbacks of the prior art.

One more object of the present invention is to form an in-line head arm assembly of a hard disk drive with a roll-bias relative to a longitudinal arm axis in order to reduce TMR otherwise caused by out-of-plane deflections of a storage disk during rotational operation thereof.

Yet one more object of the present invention is to provide a plurality of methods and designs for adding a predetermined roll-bias to a data transducer suspension assembly of a hard disk drive.

A hard disk drive in accordance with principles of the present invention comprises at least one data storage disk rotating relative to a drive base. An actuator block is pivotally mounted to the base plate and defines at least two head arms. Each head arm supports at least one load beam carrying a gimbal mounted slider in order to position a data transducer head formed at an edge of the slider at concentric track locations recorded on an adjacently facing data storage surface of the disk. The disk is susceptible to out-of-plane distortion during disk rotation. Accordingly, the head arms and load beams are mounted at roll-bias angles selected to reduce coupling between radial and out-of-plane disk deflections and TMR.

In one aspect of this facet of the invention a mounting surface of each of the head arms for mounting the load beam is shaped to define at least one component of the roll-bias angle. In the situation of two arms facing opposite surfaces of a single storage disk, the mounting surface of one of the head arms is shaped to lie in one plane and the mounting surface of the other head arms lies in a second plane, and the first and second planes are convergent relative to a facing data storage surface of the disk in a direction toward an axis of disk rotation.

In another aspect of this facet of the invention a plurality of wedge-shaped shims are sandwiched between head arms and the load beams in order to establish the roll-bias angles.

In one more aspect of this facet of the invention the load beams are preformed to define the roll-bias angles, and they are mounted in their preformed state to the head arms.

In still another aspect of this facet of the invention the head arms are preformed to define the roll-bias angles, and conventional load beams are mounted to the preformed head arms.

In yet another aspect of this facet of the invention, the load beam base plates are preformed to define the roll-bias angles, and the load beam assemblies are attached to the head arms at the defined roll-bias angles.

As another facet of the present invention, a method is provided for reducing TMR due to out-of-plane motions of a storage disk rotating relative to a base within a hard disk drive. A head arm is pivotally mounted to the base for supporting a load beam carrying a gimbal mounted slider to position a data transducer head formed at an edge of the slider at concentric track locations defined on an adjacently facing data storage surface of the disk. The disk is susceptible to out-of-plane distortion during disk rotation otherwise resulting in TMR. The method comprises the steps of:

measuring a base plate-roll-bias angle between the rotating data storage disk and the head arm with a precision measuring device, and connecting the head arm and load beam at roll-bias angles selected to reduce coupling between radial and out-of-plane disk deflections and TMR.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the Drawings:

FIG. 16A is an enlarged, exploded isometric view of a load beam and head arm junction in which a load beam base plate has been coined along one edge to define features for establishing the predetermined roll-bias in accordance with principles of the present invention.

FIG. 16B is an enlarged cross-sectional view of the FIG. 16A assembly.

FIG. 22A is an enlarged exploded isometric view of a load beam and head arm junction in which the load beam has been shaped or coined to define a set of dimples which establish a predetermined roll-bias upon assembly of the load beam to a flat head arm in accordance with principles of the present invention.

FIG. 22B is a cross-sectional view of the FIG. 22A structure, taken along section line B—B in FIG. 22A.

FIG. 22C is an enlarged cross-sectional assembly view of the FIG. 22A structure.

DETAILED DESCRIPTION OF PREFERRED EMBODIMENTS

Figure 1:
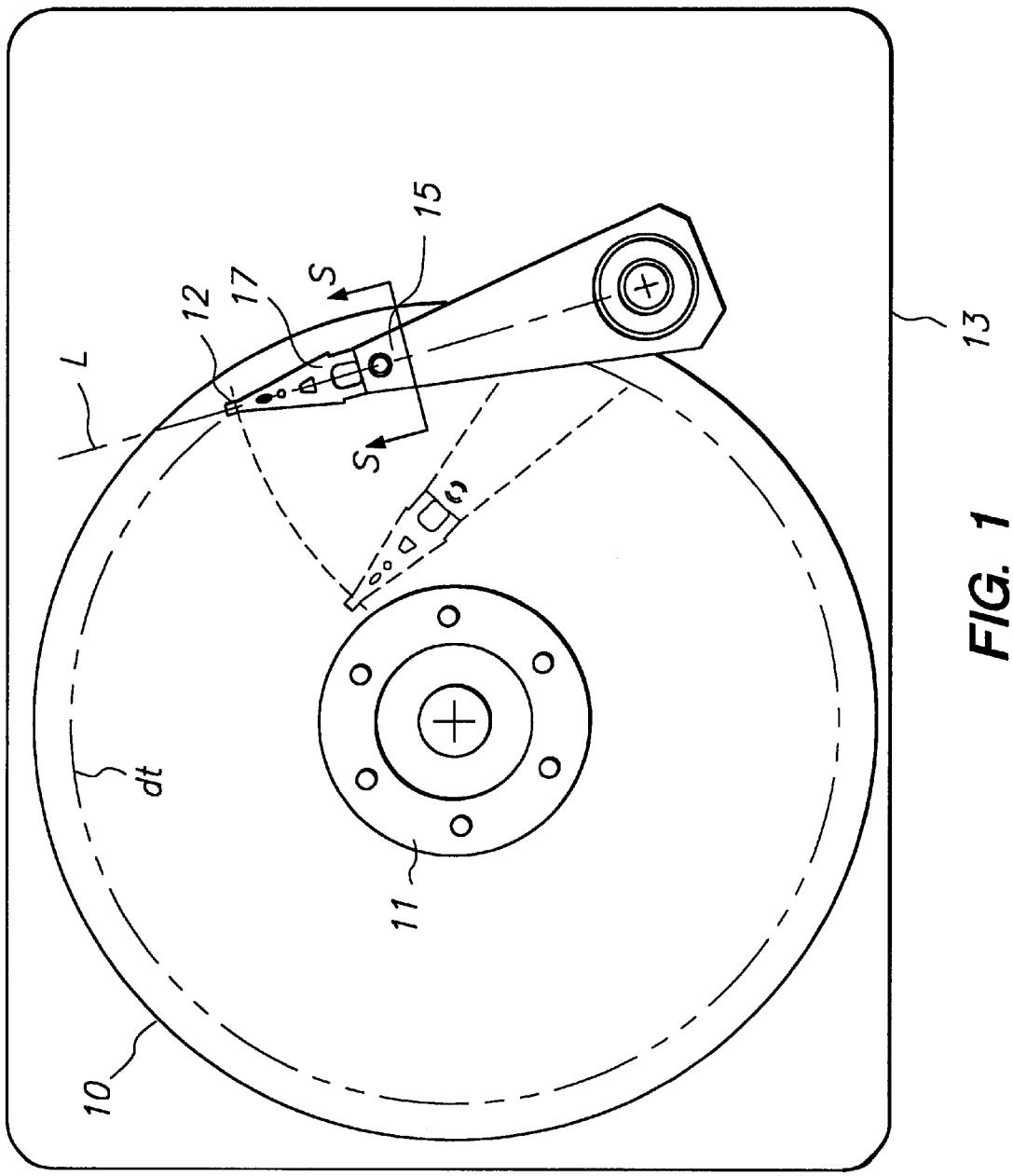
FIG. 1 is an enlarged, diagrammatic plan view of a hard disk drive head/disk assembly which has been improved by inclusion of at least one roll-biased head suspension in accordance with principles of the present invention.

A disk drive HDA as shown in FIG. 1 is improved by addition of roll-bias in order to reduce TMR caused by out-of-plane movements of the storage disk 10 in response to one or several ones of many potential sources of vibrational or shock energy forces. Roll bias is applied relative to a plane of the head arm 15 along a longitudinal axis L. The head arm arrangement shown in FIG. 1 is known in the art as an "in-line" rotary voice coil actuator in which the load beam 17 extends in alignment along the axis L from an end of the head arm 15 of the actuator E-block structure to an axis of rotation of the voice coil actuator As shown in FIG. 2A, a nominal parallel alignment is desired between a stack 10 of storage disks, and a head arm structure 15, as referenced to the base 13. In the situation of perfect parallelism between the disks 10 and actuator 15 as established by base 13, some disk radial and out-of-plane deflection will couple to TMR because of an inherent response structurally of the slider 12 and gimbal 16.

Figure 2C:
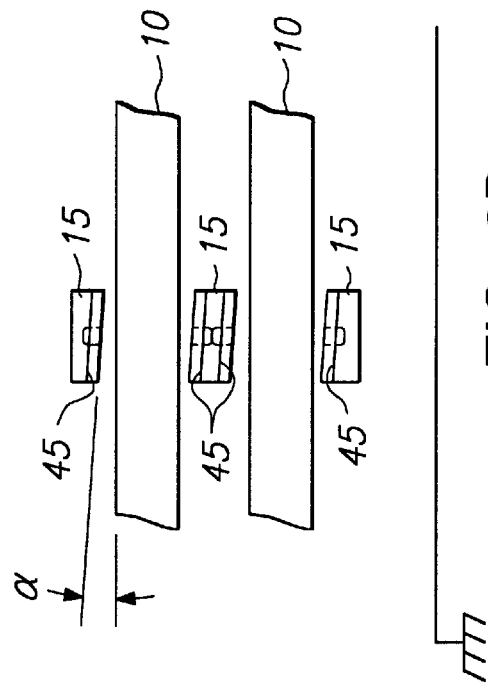
FIG. 2C is similar to FIG. 2A and shows the actuator arms to be out of parallelism with the base and disks.
Figure 2D:
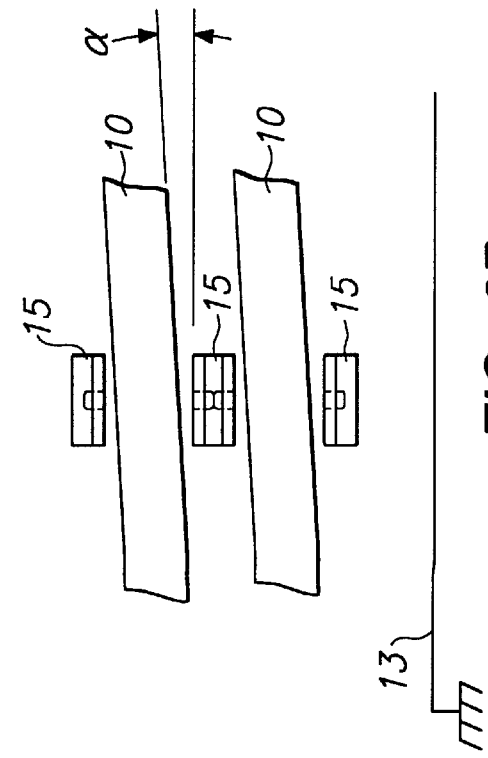
FIG. 2D is similar to FIG. 2A and shows base plates of the actuator arms to be machined out of parallelism with the base and disks.
Figure 2A:
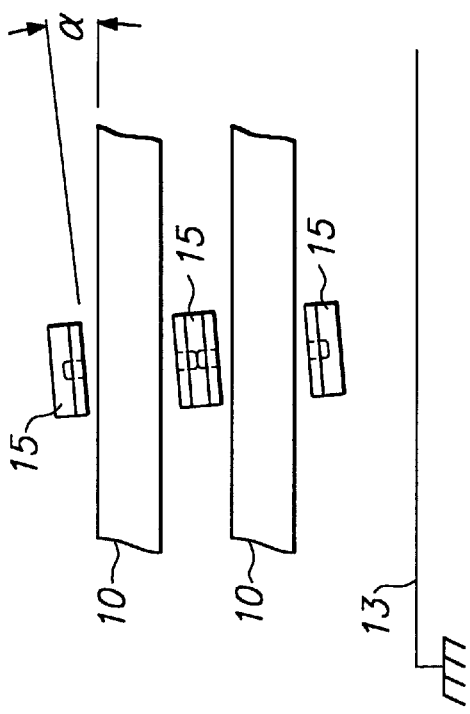
FIG. 2A is a diagrammatic view in section and elevation taken along section line S—S of a conventional hard disk drive similar to the one illustrated in FIG. 1 but showing a nominal parallel plane relationship between the head arm and the disks.
Figure 2B:
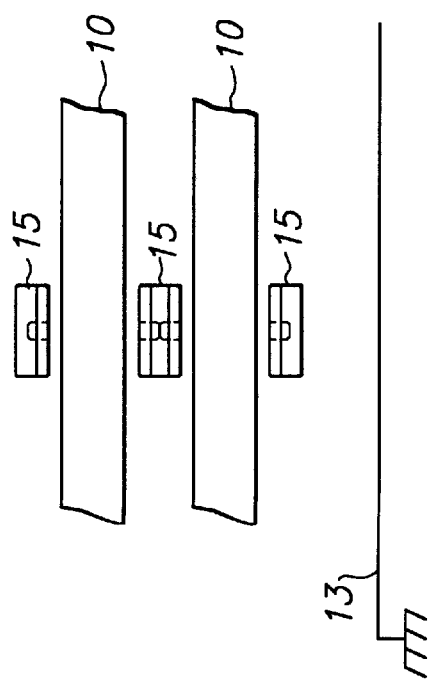
FIG. 2B is a diagrammatic view in section and elevation taken along a section line S—S of another hard disk drive similar to the one illustrated in FIG. 1 but showing the disks to be out of parallelism with the base and actuator arms.

Additionally, as shown in FIGS. 2B, 2C and 2D, there may be slight discrepancies between the parallel planarity between the disks 10 and the head arm structure 15. In FIG. 2B, the disks 10 are shown to be out of parallel relative to the base 13 and the head arms 15. In FIG. 2C, the actuator arms 15 are shown to be out of parallel relative to the base 13 and disks 10. In FIG. 2D, the base plate or swage plate faces 45 of head arms 15 have been machined out of specification, in a "Venetian blind" manner such that, while the actuator structure 15 rotates in a plane parallel to planes of rotation of the disks 10, the load beams 17 are mounted at roll-bias angles adding to and subtracting from TMR, depending upon whether the transducers are upfacing or downfacing relative to the disks 10. In some situations it can be expected that the disks and head arms will not be perfectly parallel with themselves or with the base 13. This tolerance is designated by the angle alpha in FIGS. 2B and 2C, and can range from +5 degrees, for example. As suggested by FIG. 2D, it has been discovered that the angular offset from parallel planarity between the disks 10 and head stack 15 has an effect of increasing TMR of some heads in the presence of out-of-plane disk motion while reducing TMR of other heads in the presence of the same motion.

Figure 3A:
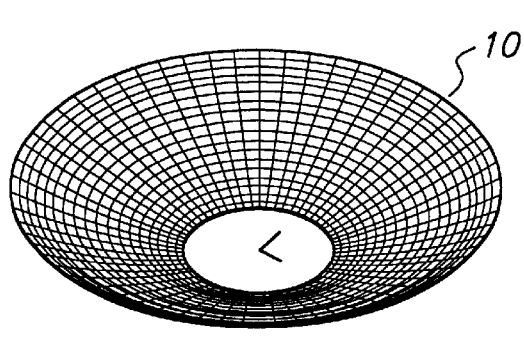
FIG. 3A is a finite element analysis representation of a storage disk manifesting a fundamental vibrational mode which distorts the disk into somewhat of a bowl shape.
Figure 3B:
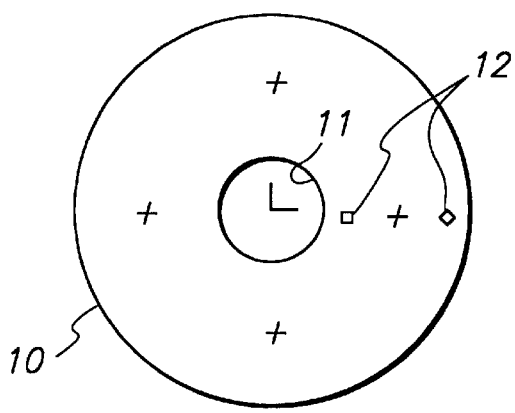
FIG. 3B is a diagrammatic plan view of the FIG. 3A disk showing that the disk deformation is unidirectional as a function of circumference, either in a positive direction (+) as shown, or a negative direction (-) not shown.
Figure 4A:
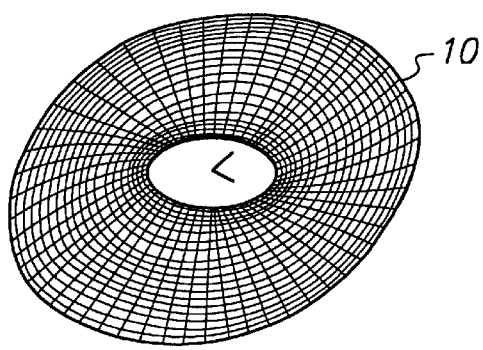
FIG. 4A is a finite element analysis representation of a storage disk manifesting a vibrational mode which distorts the disk along a single nodal line.
Figure 4B:
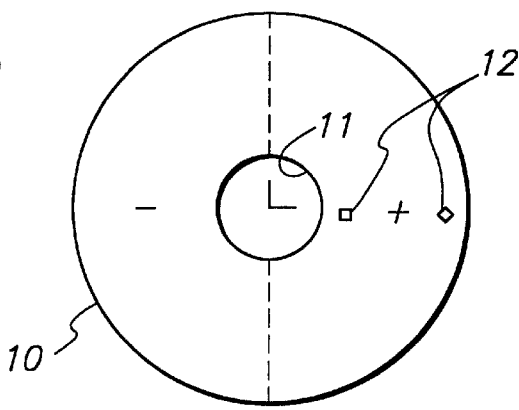
FIG. 4B provides a diagrammatic plan view of the FIG. 4A disk showing the single nodal line, with one half of the disk surface distorted in a negative or downward direction, and the other half of the disk distorted in a positive or upward direction.
Figure 5A:
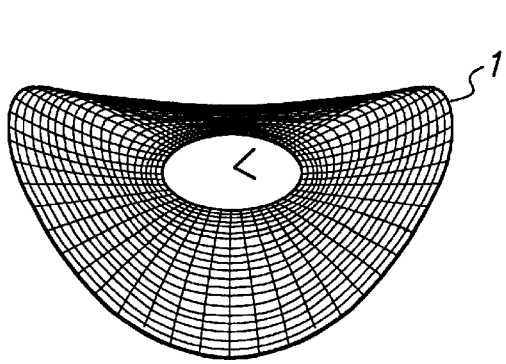
FIG. 5A is a finite element analysis representation of a storage disk manifesting a vibrational mode which distorts the disk along two nodal lines which are normal to each other.
Figure 5B:
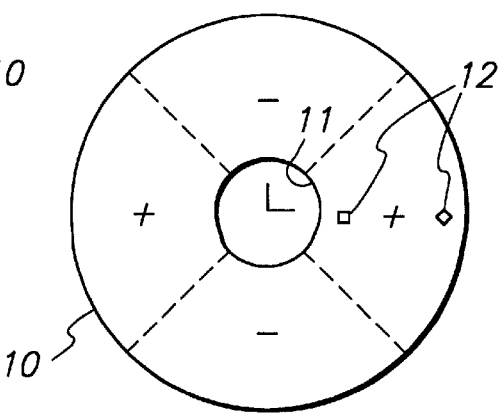
FIG. 5B provides a diagrammatic plan view of the FIG. 5A disk showing the two intersecting nodal lines, with two non-adjacent quadrants of the disk distorted upwardly (+) and two non-adjacent quadrants of the disk distorted downwardly (−).

Several examples of disk radial and out-of-plane motion are graphed in FIGS. 3A–3B, 4A–4B and 5A–5B. In FIG. 3A, the disk 10 is moving or vibrating in a first or fundamental mode of out-of-plane motion, and is becoming bowl-shaped, rather than planar. The plus (+) symbols in FIG. 3B indicate that the disk deflections are unidirectionally "upward", thereby forming the "bowl" shape. In FIG. 4A, the disk 10 is moving or vibrating in a mode characterized by a single nodal line (shown as a vertical dashed line bisecting disk 10 in FIG. 4B). In this second mode the right one half of the disk 10 has become distorted upwardly (+), while the left one half of the disk 10 has distorted downwardly (−). In FIG. 5A, the disk 10 is moving or vibrating in a mode characterized by two nodal lines bisecting at right angles. In this third mode the disk 10 is effectively divided into quadrants, with two opposite quadrants being distorted upwardly (+) and two opposite quadrants being distorted downwardly (−), as shown in FIG. 5B.

In FIGS. 3B, 4B, and 5B, a disk spindle 11 and the read/write transducer slider 12 are shown, the slider 12 being illustrated without its suspension at radially inward and radially outward positions. Other disk vibrational modes, including spindle motor axial mode and rocking mode, are known and contemplated, but not illustrated, in the present discussion.

Figure 6:
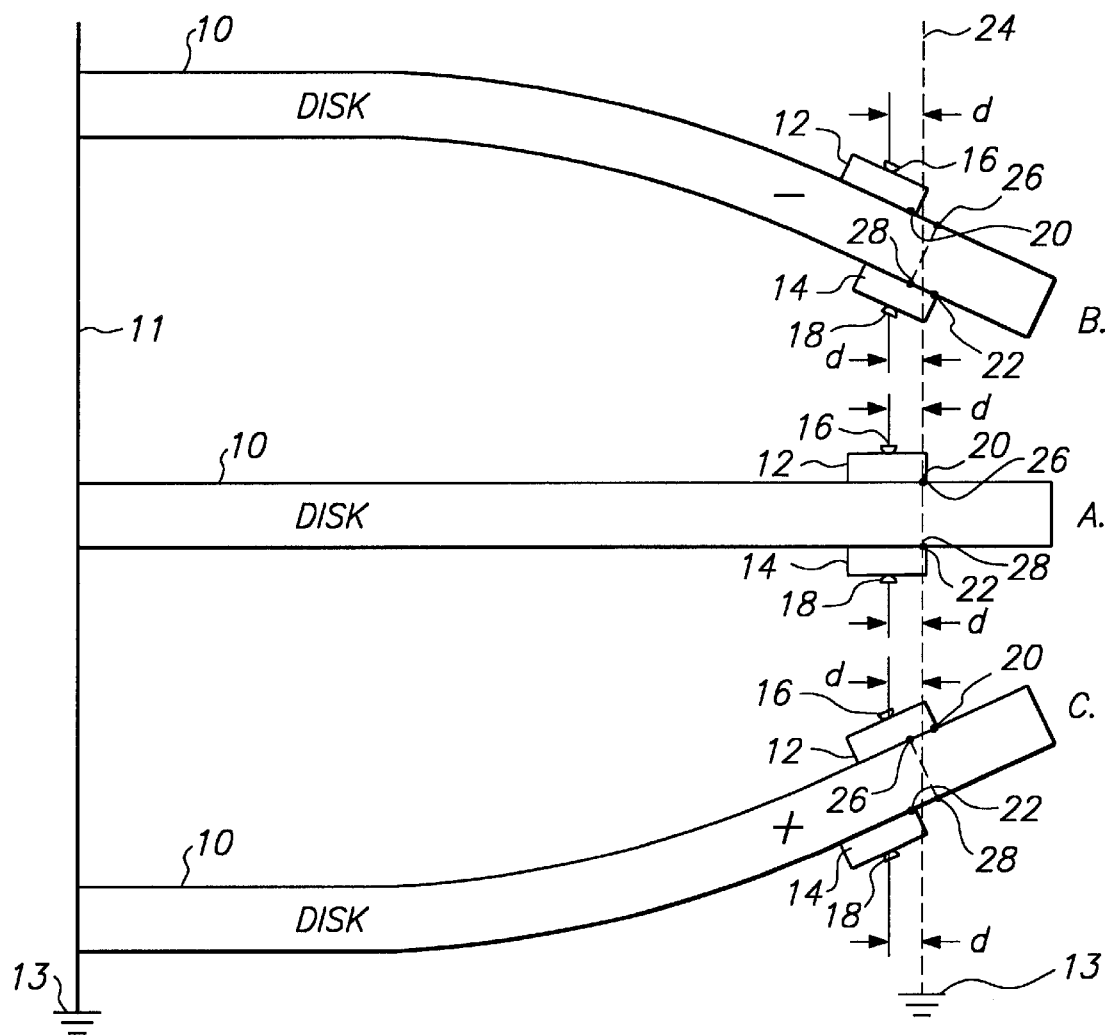
FIG. 6 is a diagrammatic view in section and elevation of a storage disk and two head/slider assemblies providing a schematic illustration of TMR vertical coupling between the heads and a disk in response to disk radial and out-of-plane deflection. View A illustrates a storage disk having no deflection. View B illustrates the disk having a "bowl-shaped" downward (−) deflection. View C illustrates the disk having a "bowl-shaped" upward (+) deflection of the type graphed in FIGS. 3A and 3B.

The problem solved by the present invention becomes more apparent in light of the FIG. 6 illustration. In view A of FIG. 6, the disk 10 is not distorted, and two sliders, a "down-facing" slider 12, and an "up-facing" slider 14 carry head transducers 20 and 22, respectively. Head gimbals 16 and 18 allow the load beam 17 to apply point contact force against the sliders 12 and 14 while granting sliders 12 and 14 two-dimensional pitch and roll freedom of movement such that the sliders 12 and 14 comply with adjacently facing storage surfaces of the disk 10. A fiducial line 24 marks a nominal track registration line relative to the base plate 13 to which the disks 10 are also physically referenced by the spindle structure 11. Circular tracks 26 and 28 are magnetically recorded on top and bottom surfaces of disk 10. In view A of FIG. 6 with the disk 10 lying within its nominal rotational plane, tracks 26 and 28 are in registration with the fiducial line 24, and with transducers 20 and 22, respectively. In view A of FIG. 6 a distance (d) marks an offset of the gimbals 16 and 18 from the fiducial line 24.

In views B and C of FIG. 6, in response to an excitation force or operating condition the disk 10 has become distorted respectively downwardly (−) and upwardly (+) relative to the base plate 13, and the coupling of this distortion to the heads 20 and 22 with resultant TMR is now apparent. In view B the circular track 26 on the top surface of disk 10 has moved radially outwardly away from the read/write element 20 of head 12, while a circular track 28 on a bottom surface of disk 10 has moved radially inwardly away from the read/write element 22 (the disk hub being shown as grounded or referenced to the base by the grounding symbol in views A, B, and C of FIG. 6. An opposite effect is graphed in view C. It should be noted in views B and C that the sliders 12 and 14 continue to conform to the disk surface, and that the distance (d) between each of the gimbals 16 and 18 and the fiducial line 24 remains substantially constant, which forces the sliders 12 and 14 and heads 20 and 22 off of centerlines of tracks 26 and 28, as illustrated. It is a substantial constancy of the dimension (d) that contributes to the TMR shown in views B and C of FIG. 6 as a function of disk vertical deflection. Other contributors include slider height and width dimensions and slider distance from the disk surface, etc.

Because TMR is in part caused by rotation about the gimbal 16 or 18, those skilled in the art will appreciate that reducing the size of slider 12 or 14 will reduce the rotational arm of the slider 12 or 14 about the gimbal 16 or 18, thus reducing the component of TMR caused by head motion. In similar fashion, because the vertical deflection of disk 10 controls both the displacement of the track 26 or 28 and the slider 12 or 14, and because vertical disk deflection monotonically increases or decreases along any radial line of the disk, it is therefore true that TMR can be reduced by limiting the radial excursion of the slider 12 or 14 across the surface of the disk 10. This implies that one can use a larger disk, but not traverse the entire radial extent of the disk, or that one could reduce TMR and secure other performance benefits by using a smaller diameter disk.

FIG. 6 presupposes that the disks 10, while in a static state, lie in planes perfectly parallel with the planes of the head arms 15. When a roll-bias via base 13 is present as illustrated in FIGS. 2B, 2C or 2D, differences in TMR between downfacing heads 12 and upfacing heads 14 are manifested, with one of the sets of heads (e.g. heads 20) manifesting small magnitude TMR while the other set of heads (e.g. heads 14) manifesting considerably larger magnitude TMR, in response to out-of-plane vertical distortions of the disks 10 (it must be implicitly acknowledged that the differing TMR magnitudes could be positive or negative). This explains why some heads, such as upfacing heads, in a given disk drive may manifest much greater TMR than other heads, such as downfacing heads, particularly as track widths become even more narrow and track densities grow higher, to 8000 tracks per inch, and above, for example.

Turning now to FIGS. 7–25, the present inventors have discovered that it is possible to apply and adjust a roll-bias of the slider support structure (whether to head arm 15, load beam 17, or both) in order to reduce the TMR occurring due to radial and out-of-plane motion of the disks 10. In FIGS. 7–25 structural elements which are the same as described earlier have been given the same reference numbers the description of those elements will not be repeated.

Figure 7:
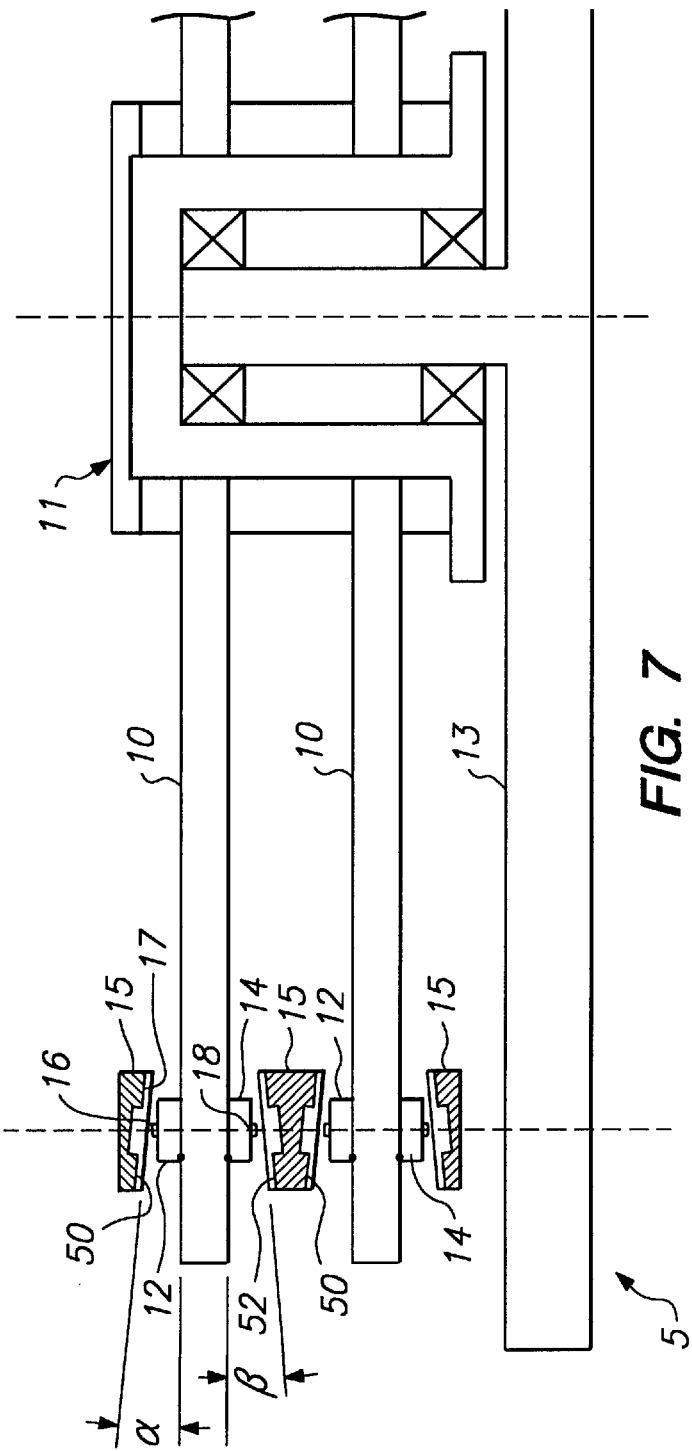
FIG. 7 shows an enlarged, highly diagrammatic view in elevation and section of a disk drive such as the one illustrated in FIG. 1 having a roll-biased head suspension for reduced TMR in accordance with principles of the present invention.
Figure 9:
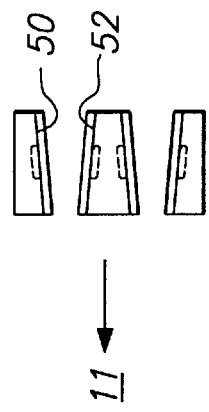
FIG. 9 is a diagrammatic view in elevation and section of the head arm suspension of FIG. 8, taken along section line A—A in FIG. 7, and illustrating a base plate structure for adding negative roll-bias to the transducer.
Figure 8:
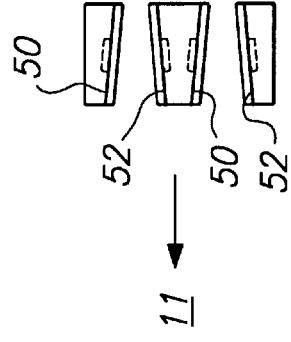
FIG. 8 is diagrammatic view in elevation and section of the head arm suspension of FIG. 7, taken along section line A—A in FIG. 7, and illustrating a base plate structure for adding positive roll-bias to the transducer.

In FIG. 7, the disk drive head/disk assembly of FIG. 1 has been modified in one presently preferred embodiment of the present invention, so that the head arms 15 have downfacing swage faces 50 and up-facing swage faces 52 which have been angled in a predetermined manner in order to reduce TMR caused by out-of-plane motion of the disks 10. FIG. 8 illustrates angling of base plate or swage plate faces 50 and 52 such that they lie in planes which diverge from and converge toward the associated storage disk 10. The FIG. 8 arrangement could be used to correct for a net positive head arm-load beam roll tolerance in a rarely occurring instance, since those skilled in the art will appreciate that applying the FIG. 8 arrangement to a nominal drive (FIG. 2A) will result in increased TMR. FIG. 9 illustrates angling of head arm swage faces 50 and 52 so they lie in planes which converge toward the disk spindle 11. The FIG. 9 arrangement is used to reduce TMR caused by a net negative head arm-load beam roll angle, which represents one important aspect of the present invention, i.e. that addition of negative roll-bias is needed to reduce TMR for out-of-plane disk motion in a nominal disk drive (e.g. FIG. 2A arrangement).

Figure 10:
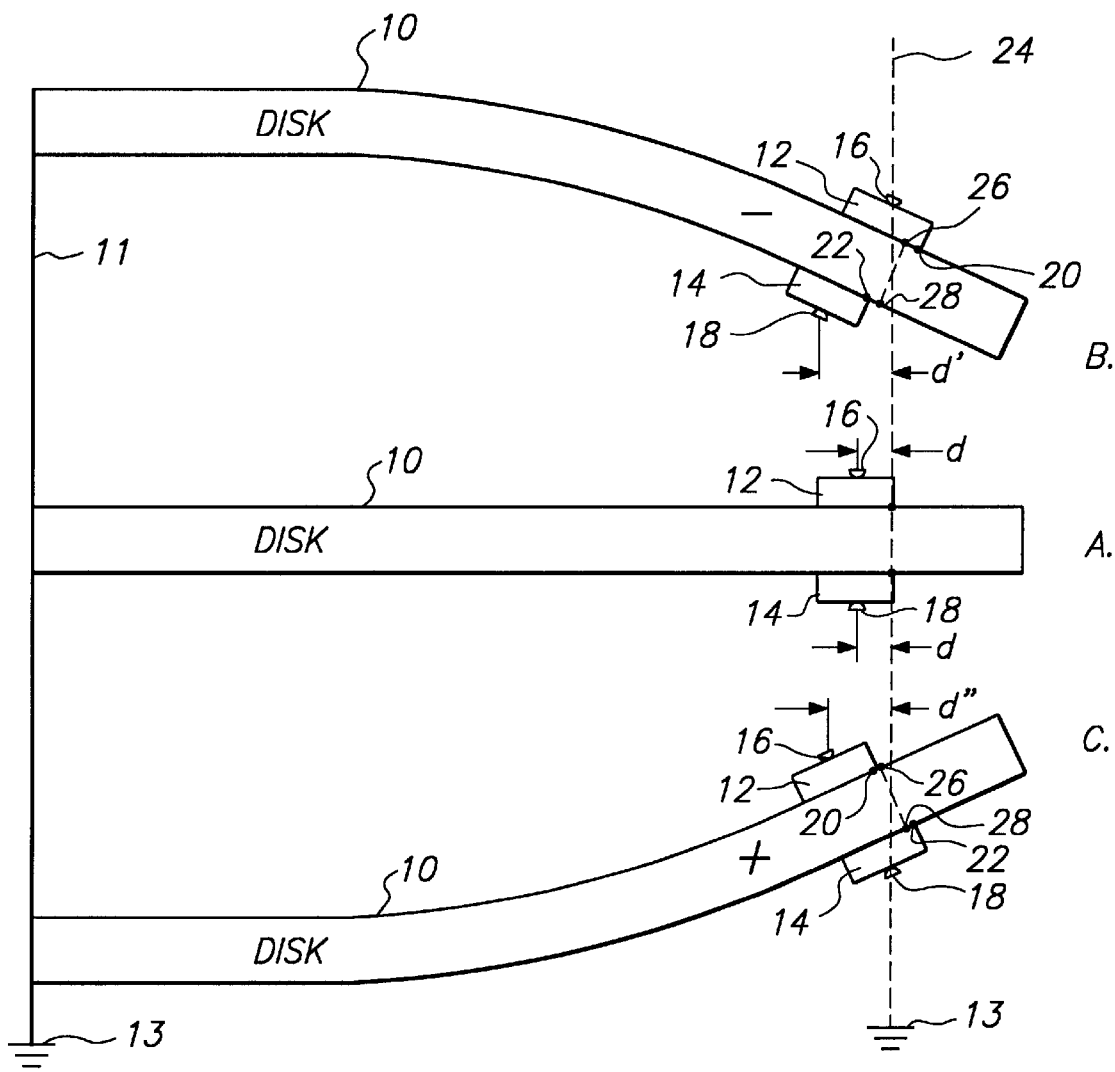
FIG. 10 is a diagram similar to the FIG. 6 diagram but illustrating the response of a roll-biased head suspension for reduced TMR in accordance with principles of the present invention. Suspension base plate roll is not shown in FIG. 10 but is present in the illustrated structure.

FIG. 10 sets forth one example of the FIG. 7 disk drive having a net negative head arm-load beam roll tolerance. In this example, which is pictorially equivalent to the FIG. 6 view, by applying the FIG. 9 roll-bias the downfacing and upfacing transducers 20 and 22 follow tracks 26 and 28 much more closely in the presence of disk negative out-of-plane movement (view B of FIG. 10) and positive out-of-plane movement (view C of FIG. 10). After adding a predetermined roll-bias to the head arms or load beams, view A of FIG. 10 shows the desired on-track alignment to tracks 26 and 28 when the disk 10 is rotating in its nominal plane. This view A of FIG. 10 is essentially the same view as view A of FIG. 6. However, views B and C of FIG. 10 differ markedly from views B and C of FIG. 6, and show the beneficial results obtained upon TMR by adding the roll-bias to the load beams supporting transducers 20 and 22. In view B of FIG. 10 which shows the disk 10 in a negative (−) distortion, the addition of negative roll-bias causes the gimbal 16 of the downfacing slider 12 to move toward the fiducial line 24, so that the slider 12 becomes closer to the line 24, and transducer 20 remains nearly aligned with track 26. At the same time, the gimbal 18 of the upfacing slider 14 has moved away from the fiducial line 24 by a distance (d') which is greater than the distance d, so that the transducer 22 remains nearly aligned with the track 28.

View C of FIG. 10 shows the response of the roll-biased head structure to a positive distortion (+) of the disk 10. In view C the gimbal 16 of the downfacing slider 12 has moved a distance (d") away from the fiducial line 24, while the gimbal 18 of the upfacing slider 14 has moved toward the line 24. The result is essentially the same as shown in view B for the negative disk distortion. Transducer 20 remains substantially aligned with track 26, and transducer 22 remains substantially aligned with track 28 with a significant reduction of TMR.

Figure 11:
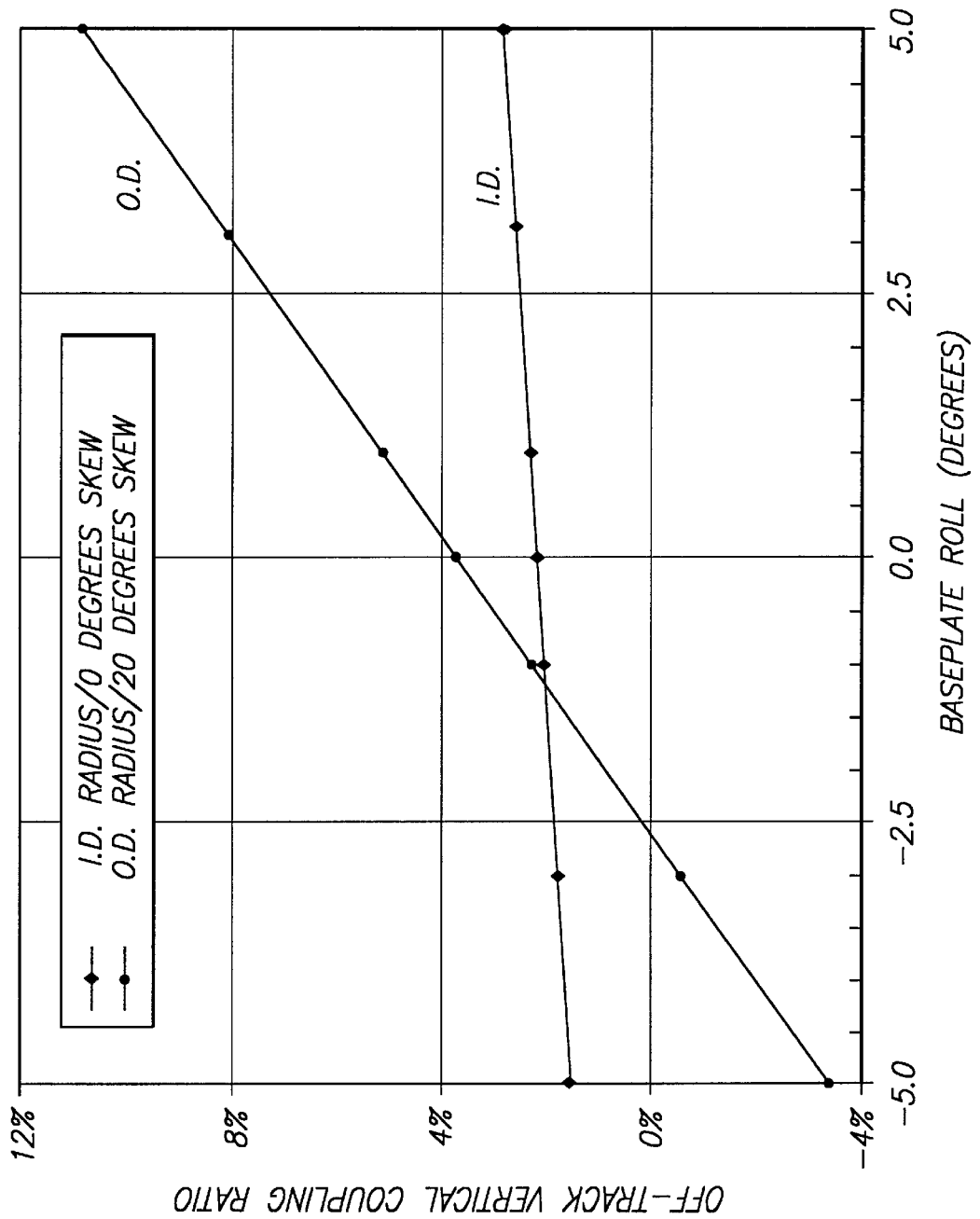
FIG. 11 is a graph of off-track vertical coupling ratio presented against base plate angle, showing TMR coupling at inside diameter (ID) and outside diameter (OD) data tracks.

FIG. 11 presents a graph of TMR versus roll-bias, such as for the drive illustrated in FIGS. 1 and 7 which demonstrates that adding a base plate roll of approximately −2.5 degrees results in a minimized TMR as a function of disk out-of-plane motion for an outside diameter track location. In FIG. 11, the horizontal axis represents the base plate roll angle in degrees, while the vertical axis represents off-track vertical coupling ratio. ("Off-track vertical coupling ratio" is defined as the net off-track distance of the head divided by the disk out-of plane or vertical displacement as measured at the disk's outside diameter.) The two plots presented in FIG. 11 represent plots for off-track vertical or out-of plane disk motion coupling ratio versus head arm-load beam (i.e. "base plate") roll angle for read/write transducers situated on a data track located at an outside diameter (O.D.), and a data track located at an inside diameter (I.D.) of the disk 10. The FIG. 11 O.D. and I.D. plots show that the coupling of vertical movement of the disk to TMR is greater for tracks located at the outside diameter of the disk, which is consistent with FIGS. 4–7. In the example of FIG. 11, a roll-bias angle of −2.5 degrees may be selected to minimize TMR as a function of out-of-plane disk motions at the outside diameter track. This negative roll-bias angle of −2.5 degrees also produces a slight reduction of TMR as a function of out-of-plane disk motions at the inside diameter track, and it should be noted that (as shown in FIGS. 6 and 10) vertical motion of the disk 10 at the I.D. is substantially lower so that TMR is also of smaller magnitude towards the I.D.

Referring again to FIG. 11 and comparing the coupling ratio for data tracks at the I.D. and O.D., the coupling ratio at I.D. locations is in fact lower than for O.D. data tracks. Thus, for a given head on a given size disk, the TMR can be minimized by limiting the extent of radial excursion of the slider. Although it is only suggested by FIG. 11, one can show that TMR increases with disk radius, and TMR is in turn caused in part by disk out-of-plane deflection. In this vein, one can argue that reducing the diameter of the storage disk (since it won't be used to store data) can be employed to reduce the maximum out-of-plane disk deflection and hence minimize the largest disk out-of-plane disk/TMR coupling ratio. The implications in reducing user data storage capacity are apparent in a reduced disk diameter solution.

Figure 12:
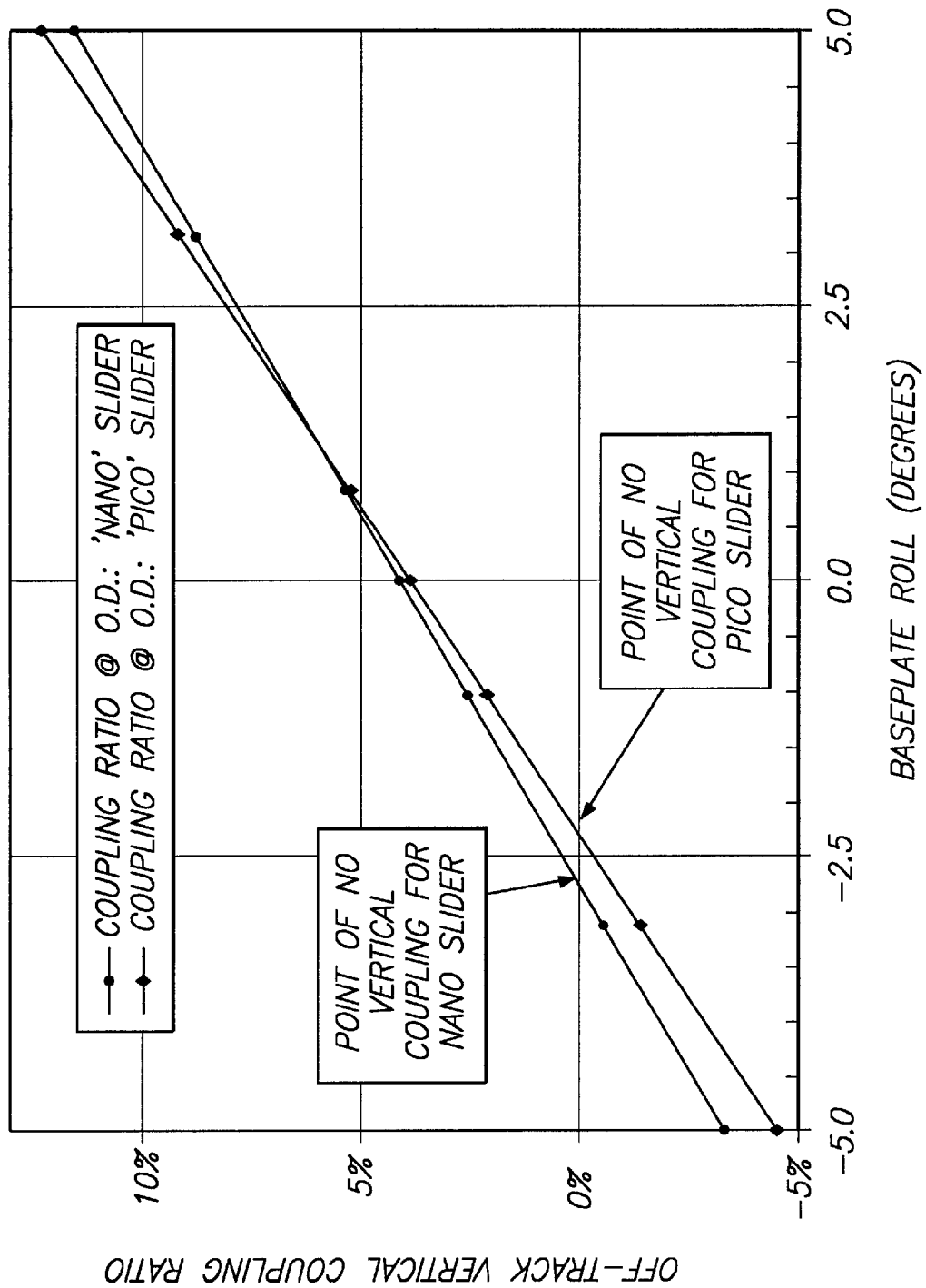
FIG. 12 is a graph of off-track vertical coupling ratios presented against base plate roll angle for pico sliders and nano sliders, showing points of minimum coupling.

Referring to FIG. 12, there is a difference in coupling responses between the so-called "nano" and "pico" sliders.

The terms "nano" and "pico" as used to describe sliders have become industry standard terms for referring to the size of the slider. A "pico" slider has height, width, and depth dimensions which are approximately 60% those of a "nano" slider. The smaller dimensions of the pico slider result in lower coupling ratios over the base plate angles of interest. As shown by FIG. 12, the base plate roll-bias angle required for nullification of coupling is approximately −2 degrees for a pico slider as compared with approximately −2.5 degrees for a nano slider.

Figure 13A:
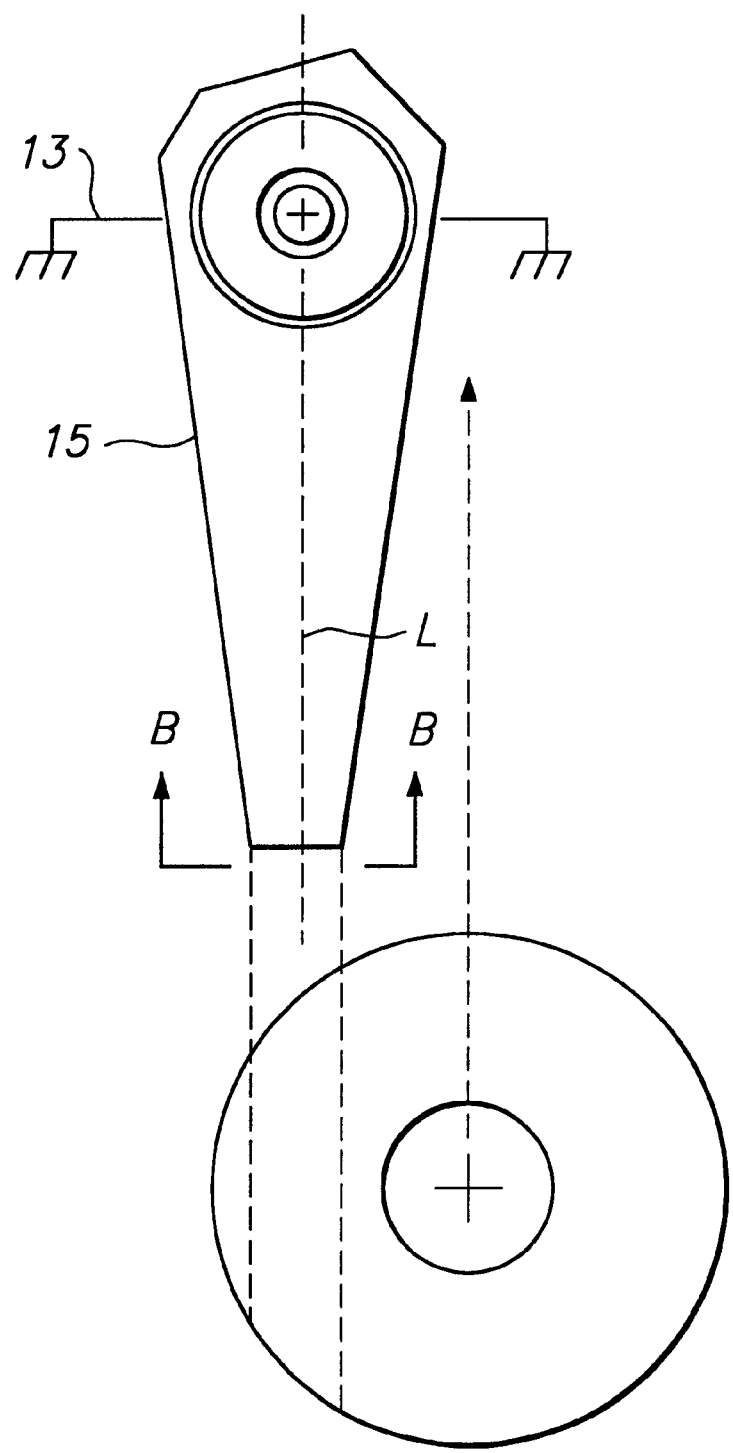
FIG. 13A is a diagrammatic plan view of a setup for machining head arm swage faces of an actuator E-block with a wedge-shaped cutting tool in order to provide a predetermined roll-bias in accordance with principles of the present invention.
Figure 13B:
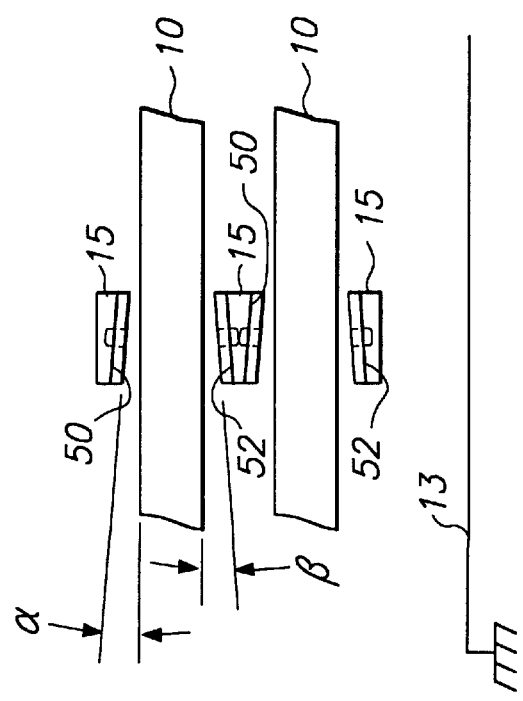
FIG. 13B is a diagrammatic end view in elevation of the swage faces of the FIG. 13A actuator E-block following the FIG. 13A machining operation and assembly of the load beam base plate.

FIG. 13A illustrates a machining setup for shaping the head arm swage faces 50 and 52 in accordance with the present invention. In this view, the actuator E-block 15 is secured to the machine tool, while a wedge-shaped cutter having two cutting faces defining the predesired wedge shape is moved toward the clamped E-block along a locus path designated by the dashed arrow. The cutter may comprise a plurality of like cutters secured as a gang to a rotating cutter spindle and thereby simultaneously form the faces for multiple head arms as shown in FIG. 13B.

Figure 14:
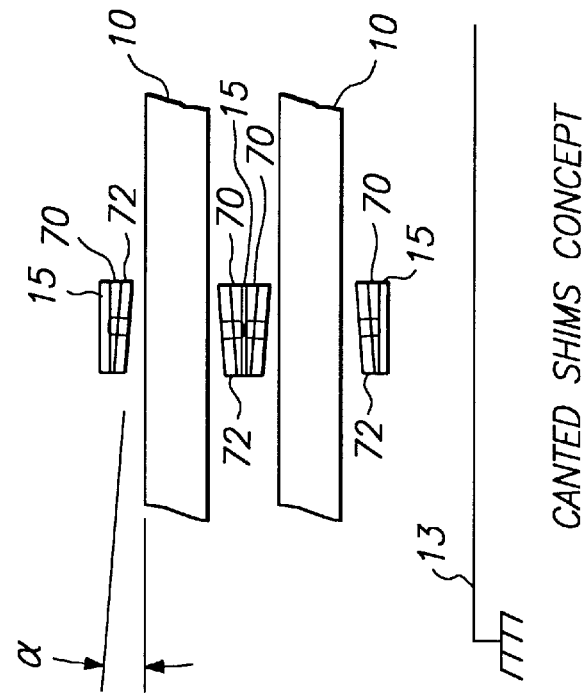
FIG. 14 is a diagrammatic end view in elevation of an alternative head arm suspension assembly of FIG. 7 showing use of shims to establish the predetermined roll-bias in accordance with principles of the present invention.

Alternatively, as shown in FIG. 14, shims 70 having the predetermined roll-bias slope may be placed between the swage face of each arm 15 and a swage plate 72 of the load beam 17. During disk drive assembly, an automated laser-based precision measuring tool can be employed to measure planarity between the disks 10 and the arms 15, and a series of wedges of selected roll-bias angle selected and installed robotically to correct for the measured base plate-roll tolerance. Alternatively, the shims may be designed to have a predetermined nominal roll angle. While process variation would increase, the need to measure each arm would be eliminated.

Figure 15:
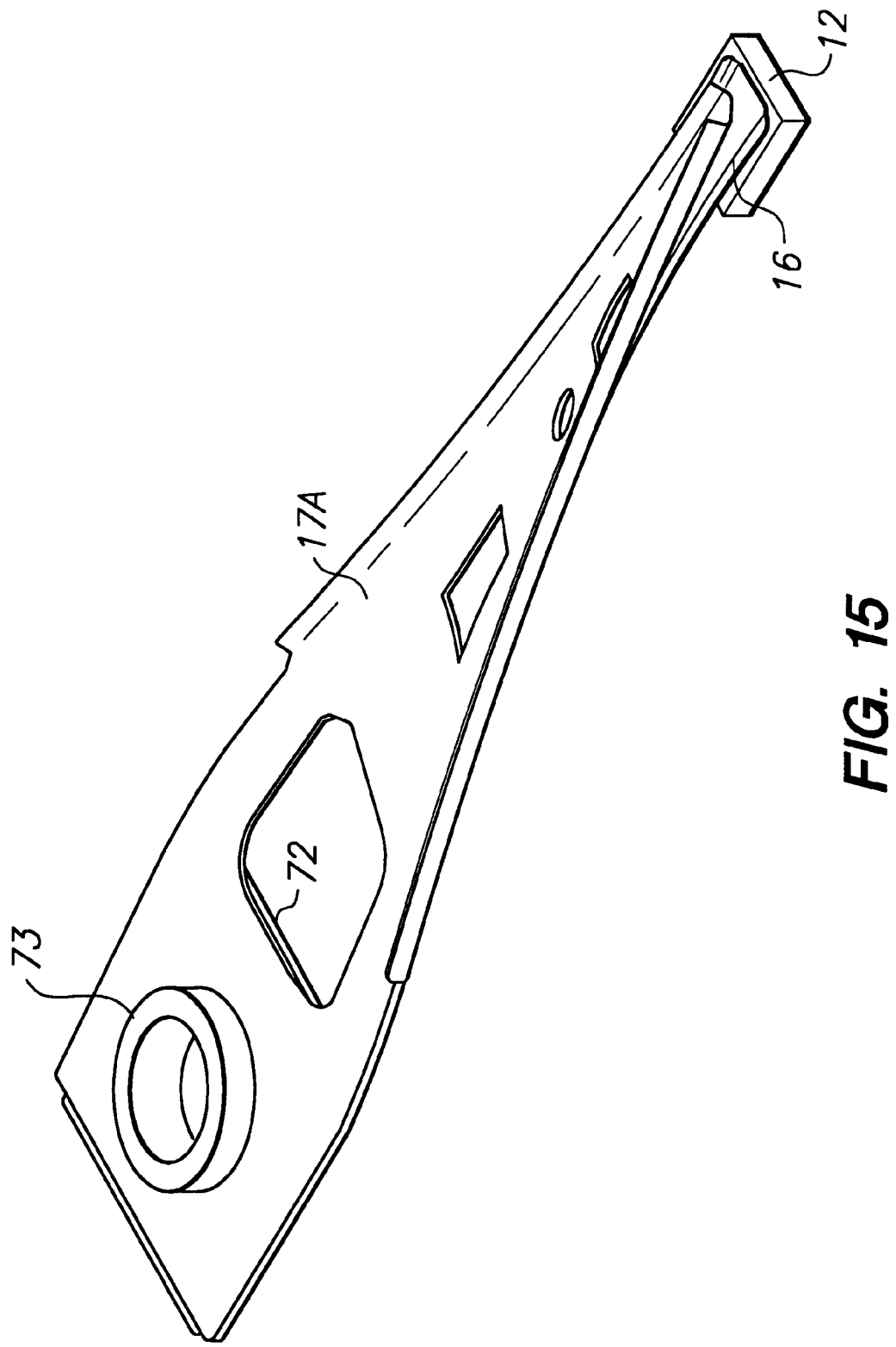
FIG. 15 is an enlarged isometric view of a load beam and slider in accordance with principles of the present invention in which the load beam has been shaped to present a predetermined roll-bias to the slider.

FIG. 15 illustrates another embodiment of the present invention. In this embodiment a load beam (spring) 17A has been permanently shaped or deformed to present the desired roll-bias to the head suspension structure. In this implementation, a robotic machine tool bends the load beam 17A to the desired roll-bias shape either prior to or incident to headstack assembly in the factory.

FIGS. 16A and 16B illustrate yet one more embodiment of the present invention. In these figures, a base plate 72A has been coined along one edge by conventional die-coining techniques to define two pillars 74 which establish the desired roll-bias angle upon assembly of the load beam 17, base plate 72A and head arm 15, as shown in FIG. 16B. The thin sheet-metal load beam 17 has been notched at 76 so as enable the coined pillars to contact the attachment surface 52 of the head arm tip region. The base plate 72 includes a swage tube 73 which is expanded by any suitable technique, such as ball-swaging, in order to bear into an opening 34 defined at the attachment end of the head arm 15.

Figure 17A:
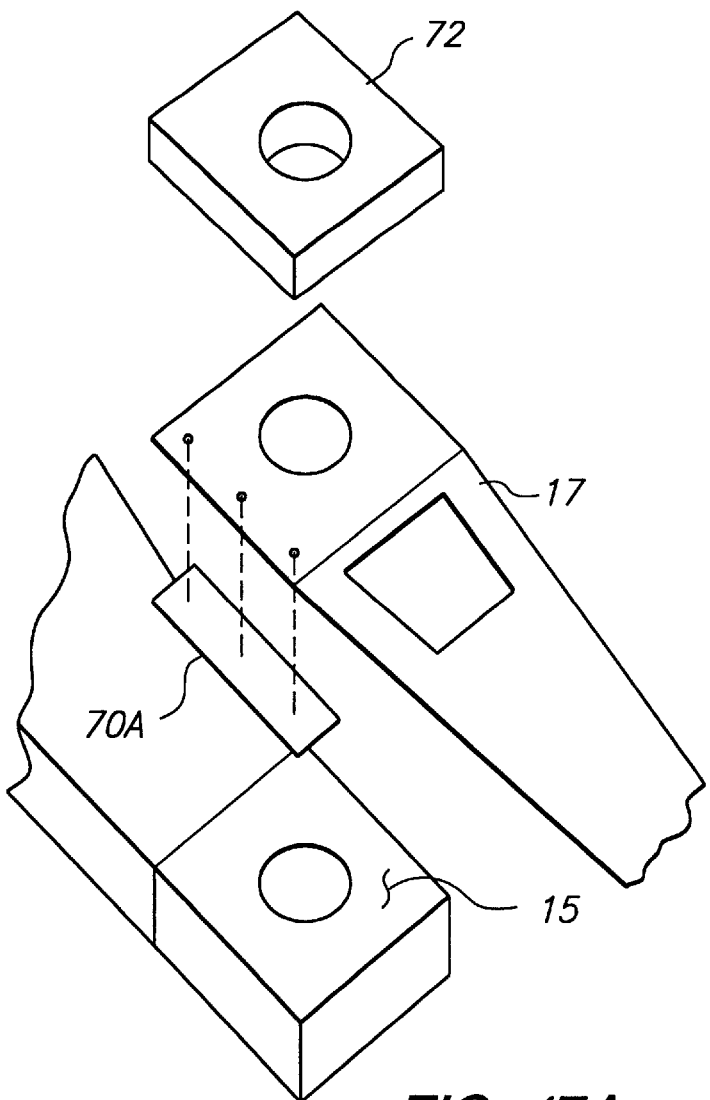
FIG. 17A is an enlarged, exploded isometric view of a load beam and a head arm junction in which a shim has been attached to the load beam before attachment to the head arm, the shim along one edge at the base plate establishing the predetermined roll-bias in accordance with principles of the present invention.
Figure 17B:
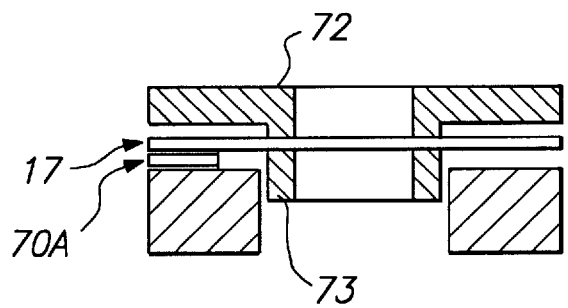
FIG. 17B is an enlarged cross-sectional view of the FIG. 17A assembly.
Figure 18A:
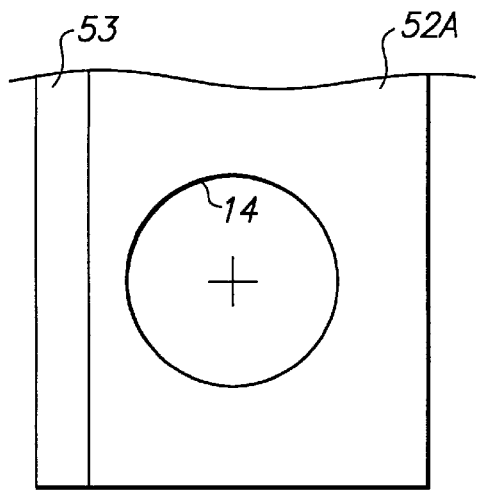
FIGS. 18A, 18B, and 18C are enlarged top plan, front and side elevational views, respectively, of a head arm having a machined step which establishes the predetermined roll-bias upon assembly of the load beam structure in accordance with principles of the present invention.
Figure 18B:
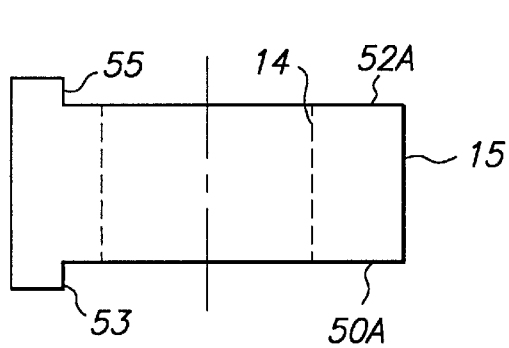
Figure 18C:
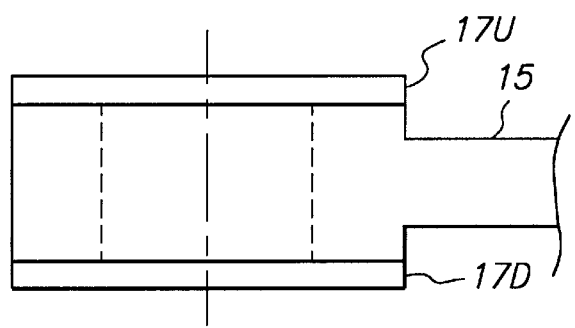
Figure 18D:
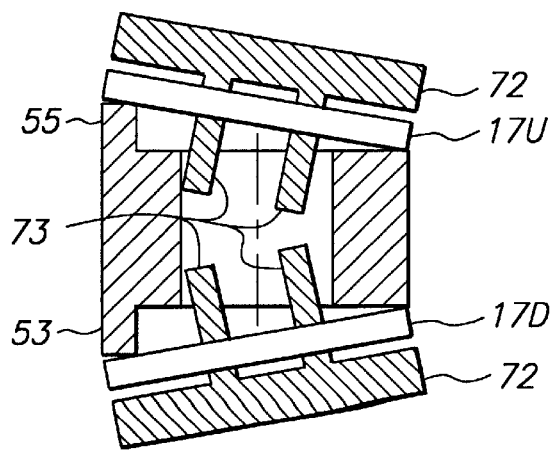
FIG. 18D is an enlarged cross-sectional view of a head arm-load beam structure including the FIGS. 18A–C machined head arm.
Figure 19B:
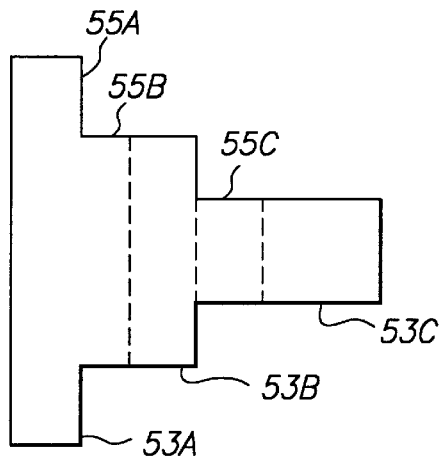
FIGS. 19A, 19B, and 19C are enlarged top plan, front and side elevational views, respectively, of a head arm having multiple machined steps to establish the predetermined roll-bias upon assembly of the load beam structure in accordance with principles of the present invention.
Figure 19C:
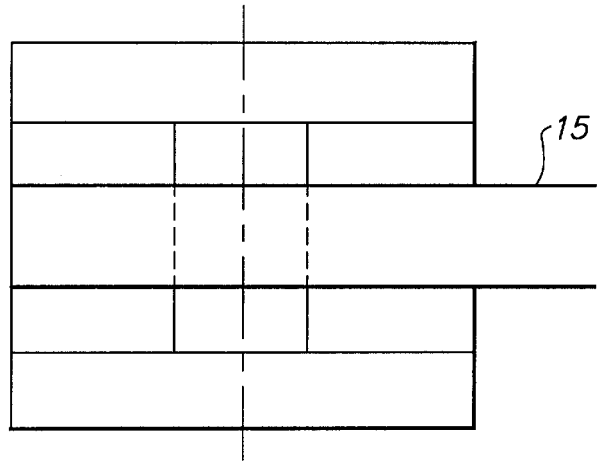
Figure 19A:
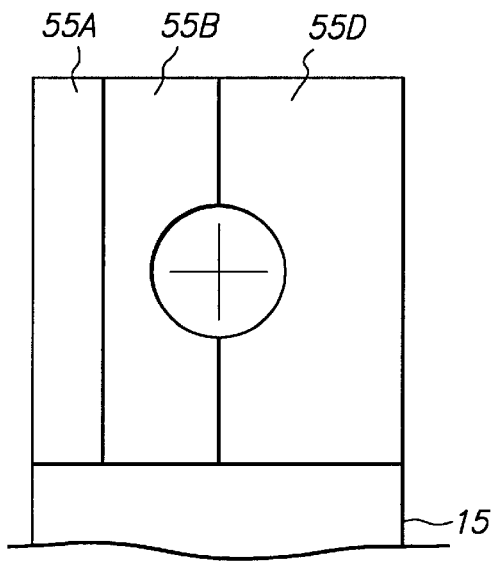
Figure 19D:
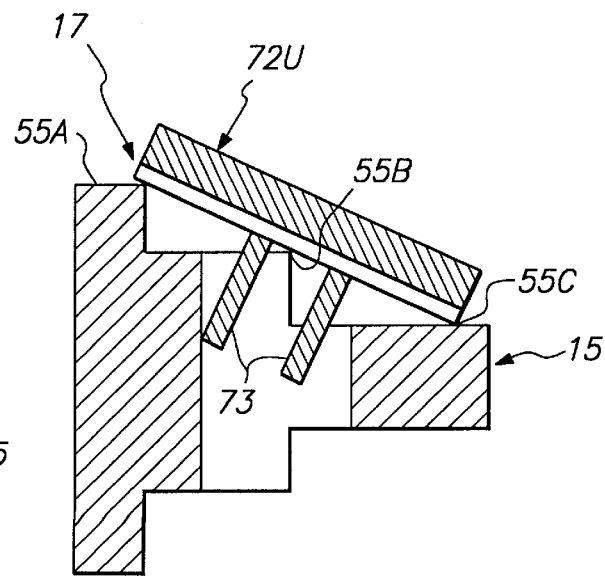
FIG. 19D is an enlarged cross-sectional view of a head arm-load beam structure including the FIGS. 19A–C multiple-stepped head arm.
Figure 20B:
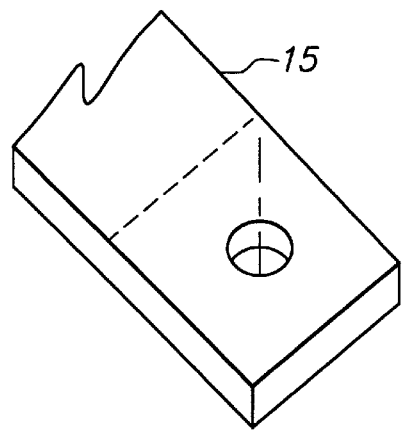
FIG. 20B is a cross-sectional view of the FIG. 20A structure, taken along section line B—B in FIG. 20A.
Figure 20B:
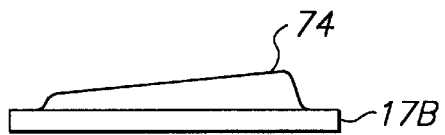
Figure 20C:
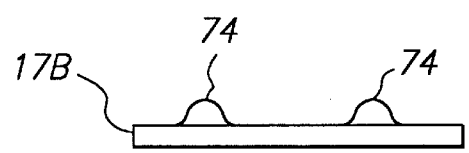
FIG. 20C is a cross-sectional view of the FIG. 20A structure, taken along section line C—C in FIG. 20A.
Figure 20A:
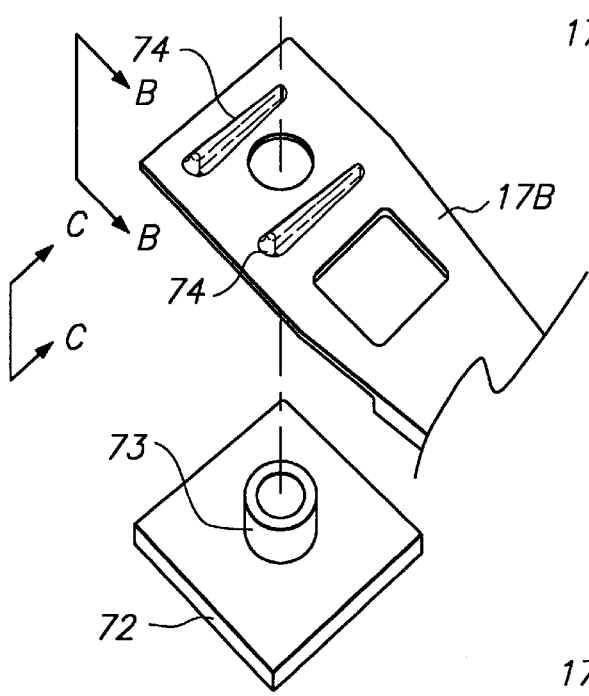
FIG. 20A is an enlarged exploded isometric view of a load beam and head arm junction in which the load beam has been coined to define two slanting ridges which establish a predetermined roll-bias upon assembly of the load beam to a flat head arm in accordance with principles of the present invention.
Figure 20D:
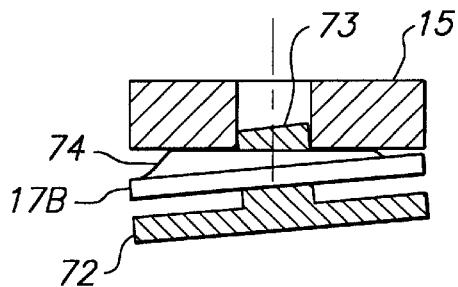
FIG. 20D is an enlarged cross-sectional assembly view of the FIG. 20A structure.
Figure 21A:
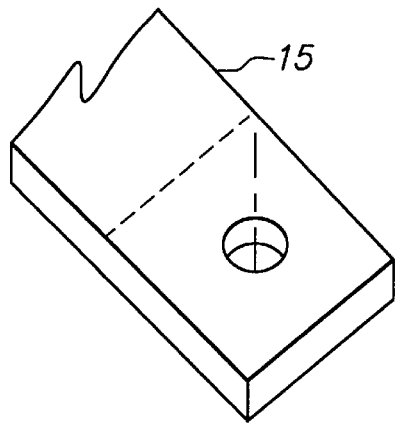
FIG. 21A is an enlarged exploded isometric view of a load beam and head arm junction in which the load beam has been coined to define two slanting ridges and a single-elevation bridging ridge between the peaks of the two slanting ridges which together establish a predetermined roll-bias upon assembly of the load beam to a flat head arm in accordance with principles of the present invention.
Figure 21A:
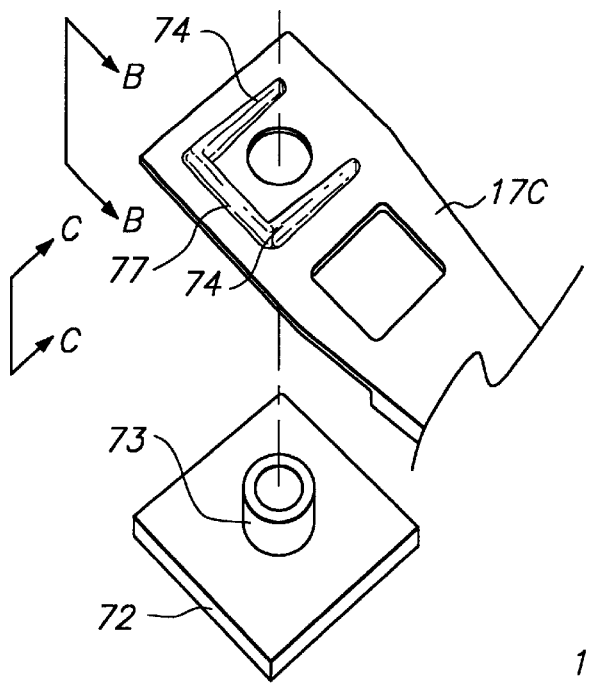
Figure 21B:
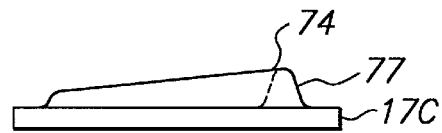
FIG. 21B is a cross-sectional view of the FIG. 21A structure, taken along section line B—B in FIG. 21A.
Figure 21C:
FIG. 21C is a cross-sectional view of the FIG. 21A structure, taken along section line C—C in FIG. 21A.
Figure 21D:
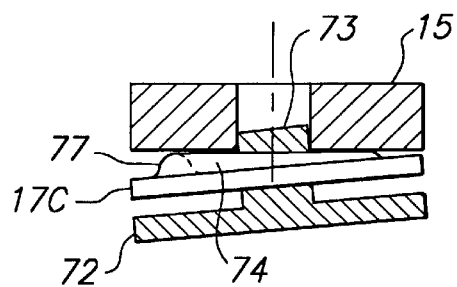
FIG. 21D is an enlarged cross-sectional assembly view of the FIG. 21 A structure.

FIGS. 17A and 17B show yet another embodiment of the present invention. In this embodiment a single shim plate 70A is spot-welded to the load beam 17, and offsets the load beam 17 and base plate 72 by the desired roll-bias angle from the head arm 15.

FIGS. 18A, 18B, 18C and 18D illustrate yet another embodiment of the present invention. In this embodiment the attachment end of the head arm has been machined on each face 50A and 52A to define ledges 53 and 55. The load beam 17 and base plate 72 are then attached to the head arm, and the elongated ledges 53 and 55 establish the desired roll-bias angles for the down-facing 17D and upfacing 17U load beam assemblies. FIGS. 19A, 19B, 19C and 19D show a further refinement of the FIGS. 18A–D approach. In FIGS. 19A–D, the attachment end of the head arm 15 has been machined to define steps 53A, 53B and 53C for the down-facing load beam 17D, and steps 55A, 55B and 55C for the up-facing load beam 17U (shown in FIG. 19D). In this arrangement, step edges establish and maintain the desired roll-bias angles.

Figure 23A:
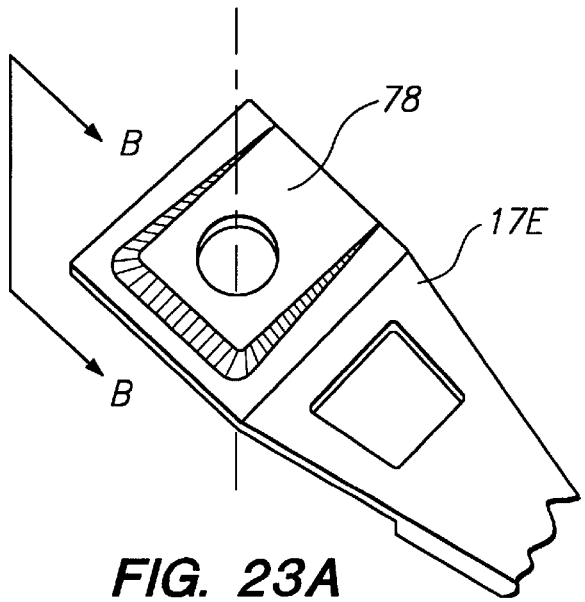
FIG. 23A is an enlarged isometric view of a load beam which has been shaped or coined to define a slanted platform which establishes a predetermined roll-bias upon assembly of the load beam to a flat head arm in accordance with principles of the present invention.
Figure 23B:
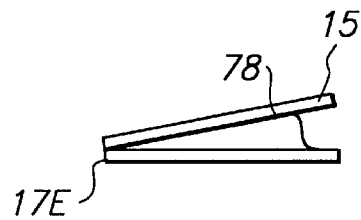
FIG. 23B is a cross-sectional view of the FIG. 23A structure, taken along section line B—B in FIG. 23A.

FIGS. 20A, 20B, 20C and 20D show one more embodiment of the present invention. This embodiment is realized by coining a pair of spaced apart, substantially parallel slanting ridges 74 transversely across a load beam 17B such that the crests of the ridges form the desired roll-bias angle upon assembly to a flat face of the head arm 15. This approach is extended by the FIGS. 21A, 21B, 21C and 21D views which show a load beam 17C having two spaced apart slanting ridges 74 joined together by a constant height bridging ridge 77 such that the crests of the ridges 74 and 77 form the desired roll-bias angle upon assembly to a flat face of the head arm 15. This approach is further extended by the FIGS. 22A, 22B, 22C and 22D views which show a load beam 17D having an array (e.g. four) of coined dimples, there being two dimples 75 of a first height, and two dimples 76 of a second height lesser than the dimples 75. In this arrangement, the dimple peaks define the desired roll-bias angle relative to the flat attachment end of the head arm 15. Further, FIGS. 23A and 23B illustrate a load beam 17E having a slanting platform 78 formed by stamping or coining which has a surface establishing the desired roll-bias angle upon assembly to a flat face of the head arm 15.

Figure 24A:
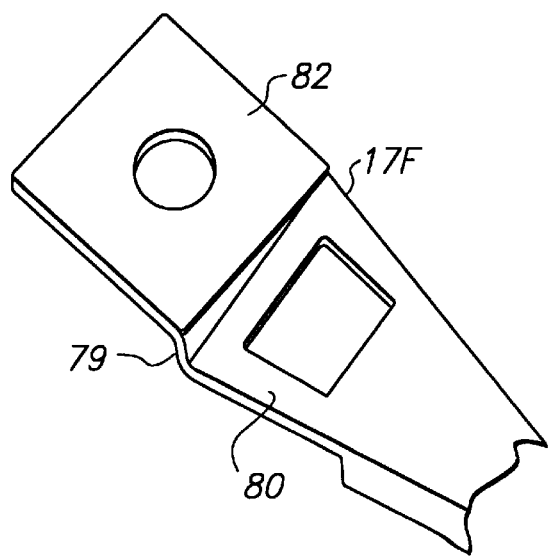
FIG. 24A is an enlarged isometric view of a load beam which has been shaped along a transverse hinge edge so that the load beam establishes a predetermined roll-bias upon assembly of the load beam to a flat head arm in accordance with principles of the present invention.
Figure 24B:
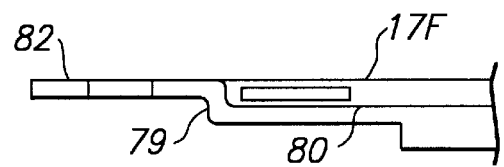
FIG. 24B is a front side view in elevation of the FIG. 24A structure.
Figure 24C:
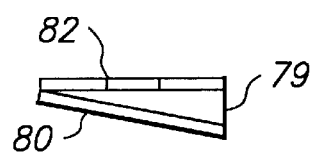
FIG. 24C is an end view in elevation of the FIG. 24A structure.
Figure 25A:
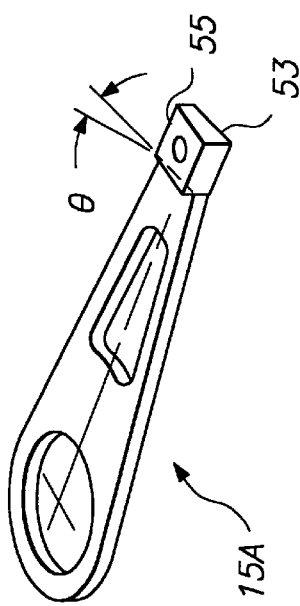
FIG. 25A is an isometric view of a discrete E-block head arm having an arm tip formed to predetermined roll-bias angles relative to a plane of rotation.
Figure 25B:
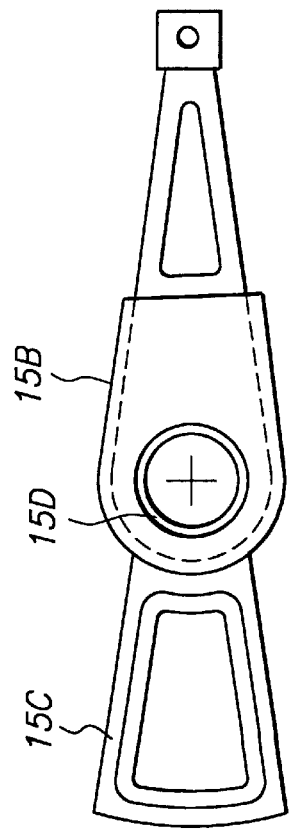
FIG. 25B is a top plan view of a composite head arm assembly formed by molding a plurality of the FIG. 25A discrete E-block head arms into a stack.
Figure 25D:
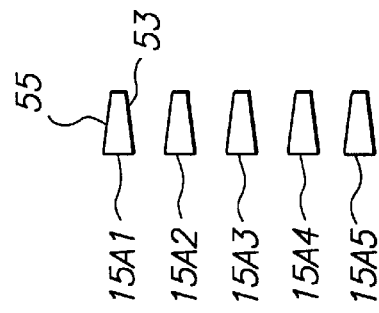
FIG. 25D is an end view of the arm tips of the FIG. 25B composite head arm assembly showing the roll-bias angles defined by each arm tip, taken along section line D—D in FIG. 25B.
Figure 25C:
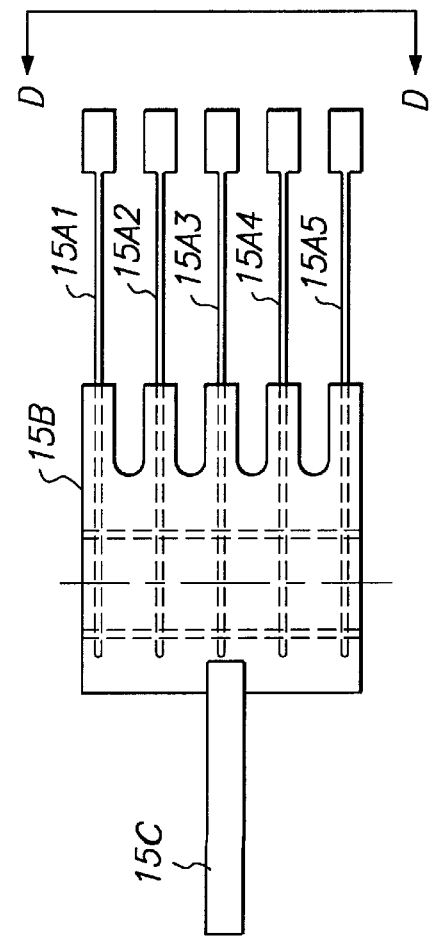
FIG. 25C is a side view in elevation of the FIG. 25B head arm assembly.

FIGS. 24A, 24B and 24C illustrate yet another load beam 17F which is shaped by pressing or coining such that slanted fold portion 79 separates planes of a spring and body portion 80 of the load beam 17F from a base plate portion 82 of the load beam 17F by the desired roll-bias angle upon assembly to a flat face of the head arm 15.

FIGS. 25A, 25B, 25C and 25D show yet another embodiment of the present invention. In this embodiment, discrete head arms 15A are formed, each having angled attachment faces 53 and 55 which are formed to define desired roll-bias angles for down facing and upfacing load beams. After the individual head arms 15A are formed, they are assembled together into a head arm stack 15B by precision molding of a suitable plastic material. A voice coil 15C is also molded into the structure at the same time. Upon final assembly the head stack includes e.g. 5 head arms 15A1, 15A2, 15A3, 15A4, and 15A5, each having attachment faces 53, 55 defining the desired roll-bias angles. Alternatively, the discrete head arms 15A may be assembled to a hub by conventional fasteners, such as screws or rivets to provide the head arm stack.

While the term "base plate", "swage plate" and "swage face" have been used herein to represent mounting surfaces facilitating attachment of the load beam 17 to the head arm 15 by a ball or rod swaging process, those skilled in the art will appreciate that other fastening mechanisms, whether screws, rivets, spot welding, staking, and any other suitable forms of joinery, may be employed to secure the load beam 17 to the end of the head arm 15. Thus, the terms "swage plate" and "swage face" are used herein to define mounting surfaces, rather than to designate or restrict the manner of joinery. Also, the term "coining" as used herein is used in a broad sense to define any shaping operation by which a member is permanently deformed in order to define a desired shape or contour, and includes e.g. pressing, stamping, expanding, and the like.

Moreover, while base plate faces 50 and 52 are shown being machined by a wedge-shaped cutting tool, or roll-angle-imparting shims 70 are sandwiched between the face 50 and load beam base plates, many other techniques, methods and structures can be used to apply the desired roll-bias to reduce TMR. For example, faces 50 and 52 may be machined by wire electro-discharge machining ("EDM"), or by precision molding or grinding. Alternatively as discussed above, the load beams themselves, or the load beam base plates, may be shaped to provide the desired roll-bias in accordance with principles of the present invention.

Head transducers contemplated for use with the present invention may be of any suitable type, whether thin-film inductive read/write, thin-film inductive/magnetoresistive read, or wirewound metal-in-gap transducers which are attached, affixed, or otherwise formed on or joined to a ceramic (or similar material) slider body.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A hard disk drive comprising at least one data storage disk rotating relative to a base, at least one head arm pivotally mounted to the base for supporting a load beam carrying a gimbal mounted slider to position a data transducer formed at an edge of the slider at concentric track locations defined on an adjacently facing data storage surface of the disk, the disk being susceptible to out-of-plane motion during disk rotation, the head arm and load beam being formed and connected at an attachment region of the head arm to form a roll-bias angle relative to the adjacently facing data storage surface, having an absolute value greater than zero degrees and being selected to reduce track misregistration by the data transducer during the out-of-plane motion of the disk.

2. The hard disk drive set forth in claim 1 wherein a mounting surface of the head arm for mounting the load beam is shaped to define the roll-bias angle, and as shaped lies in a plane which converges with a plane including the adjacently facing data storage surface and following a line direction toward an axis of rotation of the disk.

3. The hard disk drive set forth in claim 2 wherein the head arm is one of a plurality of head arm portions of a unitary E-block assembly comprising a rotary voice coil actuator, and mounting surfaces of the head arm portions are machined to define roll-bias angles.

4. The hard disk drive set forth in claim 2 wherein mounting surfaces of the head arm portion are machined substantially flat and define a wedge in transverse cross-section.

5. The hard disk drive set forth in claim 2 wherein a mounting surface of the head arm portion is machined to define at least two steps such that the load beam resting upon edges of the steps is at the roll-bias angle.

6. The hard disk drive set forth in claim 5 wherein the mounting surface is machined to define at least three steps such that the load beam resting upon edges of the three steps is at the roll-bias angle.

7. The hard disk drive set forth in claim 2 wherein the head arm is discrete and has mounting surfaces shaped to define roll-bias angles, and wherein a plurality of discrete head arms are assembled together to form a rotary voice coil actuator.

8. The hard disk drive set forth in claim 1 further comprising at least one shim between the head arm and the load beam for establishing the roll-bias angle.

9. The hard disk drive set forth in claim 8 wherein the at least one shim comprises a wedge-shaped shim.

10. The hard disk drive set forth in claim 8 wherein the at least one shim comprises a spacer of predetermined thickness aligned along one longitudinal edge of the load beam for offsetting the load beam relative to the head arm as to obtain the roll-bias angle.

11. The hard disk drive set forth in claim 1 wherein the load beam is preformed to define the roll-bias angle.

12. The hard disk drive set forth in claim 11 wherein the load beam is preformed along a longitudinal axis to define the roll-bias angle.

13. The hard disk drive set forth in claim 11 wherein an attachment region of the load beam is deformed to define a plurality of features, crests of the features defining the roll-bias angle upon assembly of the load beam and the head arm.

14. The hard disk drive set forth in claim 11 wherein an attachment region of the load beam is deformed to define an array of dimples having transverse graduated heights such that peaks of the dimples define the roll-bias angle upon assembly of the load beam and the head arm.

15. The hard disk drive set forth in claim 11 wherein the load beam includes a base plate and the base plate is preformed to define the roll-bias angle.

16. The hard disk drive set forth in claim 15 wherein the base plate is coined along one longitudinal edge thereof to define at least one feature establishing the roll-bias angle upon assembly with the head arm.

17. The hard disk drive set forth in claim 1 wherein the roll-bias angle lies in a range of plus or minus five degrees from zero.

18. A hard disk drive comprising at least one data storage disk rotating relative to a base plate, an actuator block pivotally mounted to the base and defining at least two head arms, each head arm for supporting a load beam carrying a gimbal mounted slider to position a data transducer head formed at an edge of the slider at concentric track locations defined on an adjacently facing data storage surface of the disk, the disk being susceptible to out-of-plane distortion during disk rotation, the head arms and load beams being mounted together at attchment regions of the head arms to form predetermined roll-bias angles between the sliders and respective adjacently facing data storage surfaces of the data storage disk, the roll-bias angles having absolute values greater than zero degrees and being selected to reduce track misregistration during the out-of-plane distortion of the disk.

19. The hard disk drive set forth in claim 18 wherein mounting surfaces of the head arms for mounting the load beams are shaped to define roll-bias angles of substantially equal absolute magnitude relative to planes occupied by adjacently facing disk storage surfaces.

20. The hard disk drive set forth in claim 19 wherein the mounting surfaces of the head arms are shaped as flat surfaces which define a wedge shape in transverse cross-section.

21. The hard disk drive set forth in claim 19 wherein the mounting surfaces of the head arms are shaped as a plurality of steps having edges for contacting and aligning the load beams at the predetermined roll-bias angles.

22. The hard disk drive set forth in claim 19 wherein the mounting surface of each of the head arms lies in a plane which converges with said planes occupied by said adjacently facing disk storage surfaces.

23. The hard disk drive set forth in claim 22 wherein the convergent planes of the mounting surfaces converge in a direction toward an axis of rotation of the disk.

24. The hard disk drive set forth in claim 18 further comprising a plurality of shims between head arms and the load beams for establishing the predetermined roll-bias angles.

25. The hard disk drive set forth in claim 24 wherein the shims are wedge-shaped and are sandwiched between the head arms and the load beams for establishing the predetermined roll-bias angles.

26. The hard disk drive set forth in claim 24 wherein the shims are mounted along like longitudinal edges of the load beams and form edges with the head arms for establishing the predetermined roll-bias angles.

27. The hard disk drive set forth in claim 18 wherein the load beams are preformed to define the roll-bias angles.

28. The hard disk drive set forth in claim 27 wherein the load beams are preformed along longitudinal axes thereof to define the roll-bias angles.

29. The hard disk drive set forth in claim 27 wherein an attachment region of the load beams is deformed to define a plurality of features, crests of the features defining the roll-bias angle upon assembly of each load beam and a corresponding head arm.

30. The hard disk drive set forth in claim 27 wherein an attachment region of the load beam is deformed to define an array of dimples having transverse graduated heights such that peaks of the dimples define the roll-bias angle upon assembly of each load beam and a corresponding head arm.

31. The hard disk drive set forth in claim 27 wherein the load beam include base plates and each base plate is preformed to define the predetermined roll-bias angle.

32. The hard disk drive set forth in claim 31 wherein the base plate is coined along one longitudinal edge thereof to define at least one feature establishing the roll-bias angle upon assembly with a corresponding head arm.

33. An in-line head arm for a hard disk drive in an actuator structure pivotally mounted to a base and a load beam carrying a gimbal mounted slider to position a data transducer formed at an edge of the slider at concentric track locations defined on an adjacently facing data storage surface of a data storage disk, the disk being susceptible to out-of-plane motion during disk rotation, the head arm and load beam being formed along a longitudinal axis and being formed and connected at an attchment region of the head arm to define a roll-bias angle between the slider and the adjacently facing data storage surface of the disk, having an absolute value greater than zero degrees and being selected to reduce track misregistration by the data transducer during the out-of-plane motion of the disk.

34. The in-line head arm set forth in claim 33 wherein a mounting surface of the head arm for mounting the load beam is shaped to define the roll-bias angle, and as shaped lies in a plane which converges with a plane including the adjacently facing data storage surface and following a line direction toward an axis of rotation of the disk.

35. The in-line head arm set forth in claim 33 further comprising a wedge-shaped shim between the head arm and the load beam for establishing the roll-bias angle.

36. The in-line head arm set forth in claim 33 wherein the load beam is preformed to define the roll-bias angle.

37. The in-line head arm set forth in claim 33 wherein the roll-bias angle lies in a range of plus or minus five degrees from zero.

38. A method for correcting track misregistration arising from out-of-plane motions of at least one data storage disk rotating relative to a base within a hard disk drive, a head arm pivotally mounted to the base for supporting a load beam carrying a gimbal mounted slider to position a data transducer head formed at an edge of the slider at concentric track locations defined on an adjacently facing data storage surface of the disk, the disk being susceptible to out-of-plane motions during disk rotation, the method comprising the steps of:

determining a roll-bias angle between the rotating data storage disk and the head arm to correct for disk out-of-plane motions, the roll-bias angle having an absolute value greater than zero degrees, and connecting the head arm and load beam at an attchment region of the head arm to form a roll-bias angle selected to correct for track misregistration resulting from out-of-plane motions of the disk.

39. The method for correcting track misregistration set forth in claim 38 wherein the connecting step includes a step of shaping a mounting surface of the head arm followed by connecting the load beam to the mounting surface at the roll-bias angle.

40. The method for correcting track misregistration set forth in claim 39 wherein the shaping step is carried out by defining a flat angled connecting region.

41. The method for correcting track misregistration set forth in claim 39 wherein the shaping step is carried out by defining a stepped connecting region.

42. The method for correcting track misregistration set forth in claim 38 wherein the connecting step is carried out by providing at least one shim between the head arm and the load beam.

43. The method for correcting track misregistration set forth in claim 38 wherein the connecting step is carried out by the step of preforming the load beam.

44. The method for correcting track misregistration set forth in claim 43 wherein the step of preforming the load beam comprises longitudinally deforming the load beam so that a gimbal attachment region lies in a plane which converges toward the adjacently facing data storage surface, and attaching the preformed load beam to the head arm.

45. The method for correcting track misregistration set forth in claim 43 wherein the step of preforming the load beam comprises forming at least one feature into the load beam at a head arm connection region and attaching the preformed load beam to the head arm.

46. The method for correcting track misregistration set forth in claim 43 wherein the load beam includes a base plate, and wherein the step of preforming the load beam comprises the step of providing the base plate with at least one feature for establishing the roll-bias angle upon attaching the preformed load beam to the head arm.

47. The method for correcting track misregistration set forth in claim 38 wherein the roll-bias angle lies in a range of plus or minus five degrees from zero.

* * * * *